US006734131B2

(12) United States Patent
Shih et al.

(10) Patent No.: US 6,734,131 B2
(45) Date of Patent: May 11, 2004

(54) HETEROGENEOUS CHROMIUM CATALYSTS AND PROCESSES OF POLYMERIZATION OF OLEFINS USING SAME

(75) Inventors: Keng-Yu Shih, Columbia, MD (US); Dean Alexander Denton, Baltimore, MD (US); Rimantas Glemza, Baltimore, MD (US)

(73) Assignee: W. R. Grace & Co.-Conn., Columbia, MD (US)

( * ) Notice: Subject to any disclaimer, the term of this patent is extended or adjusted under 35 U.S.C. 154(b) by 0 days.

(21) Appl. No.: 10/120,289

(22) Filed: Apr. 10, 2002

(65) Prior Publication Data

US 2003/0162917 A1 Aug. 28, 2003

Related U.S. Application Data

(60) Provisional application No. 60/287,601, filed on Apr. 30, 2001.

(51) Int. Cl.[7] .................................. B01J 21/16
(52) U.S. Cl. .................... 502/80; 502/254; 502/86; 502/103; 502/84; 526/104; 526/348; 526/129
(58) Field of Search ................... 502/80, 254, 86, 502/103, 84; 526/104, 348, 129

(56) References Cited

U.S. PATENT DOCUMENTS

| | | | |
|---|---|---|---|
| 2,825,721 A | 3/1958 | Hogan et al. .............. 260/88.1 |
| 4,131,452 A | 12/1978 | Collin ........................ 75/60 |
| 4,176,090 A | 11/1979 | Vaughan et al. ............ 252/455 |
| 4,216,188 A | 8/1980 | Shabtai et al. ............. 423/118 |
| 4,238,364 A | 12/1980 | Shabtai .................... 252/455 |
| 4,248,739 A | 2/1981 | Vaughan et al. ............ 252/455 |
| 4,271,043 A | 6/1981 | Vaughan et al. ............ 252/455 |
| 4,367,163 A | 1/1983 | Pinnavaia et al. .......... 252/455 |
| 4,375,406 A | 3/1983 | Santilli ..................... 208/251 |
| 4,629,712 A | 12/1986 | Pinnavaia et al. .......... 502/63 |
| 4,637,992 A | 1/1987 | Lewis et al. ............... 502/84 |
| 4,666,877 A | * 5/1987 | Vaughan ................... 502/84 |
| 4,761,391 A | 8/1988 | Occelli .................... 502/63 |
| 4,859,648 A | 8/1989 | Landis et al. .............. 502/242 |
| 4,981,825 A | 1/1991 | Pinnavaia et al. .......... 502/63 |
| 4,995,964 A | * 2/1991 | Gortsema et al. .......... 208/112 |
| 5,064,802 A | 11/1991 | Stevens et al. ............ 502/155 |
| 5,225,500 A | 7/1993 | Elder et al. ............... 526/127 |
| 5,238,892 A | 8/1993 | Chang .................... 502/111 |
| 5,241,025 A | 8/1993 | Hlatky et al. ............. 526/129 |
| 5,243,002 A | 9/1993 | Razavi ..................... 526/170 |
| 5,250,277 A | 10/1993 | Kresge et al. ............ 423/329.1 |
| 5,308,811 A | * 5/1994 | Suga et al. ................ 502/62 |
| 5,321,106 A | 6/1994 | LaPointe ................. 526/126 |
| 5,360,775 A | * 11/1994 | Suda et al. ................ 502/84 |
| 5,362,825 A | 11/1994 | Hawley et al. ............ 526/125 |
| 5,395,808 A | 3/1995 | Miller et al. ................ 502/7 |
| 5,399,636 A | 3/1995 | Alt et al. ................ 526/129 |
| 5,403,799 A | 4/1995 | Miller et al. .............. 502/64 |
| 5,403,809 A | 4/1995 | Miller et al. ............. 502/413 |
| 5,427,991 A | 6/1995 | Turner ..................... 502/103 |
| 5,541,272 A | 7/1996 | Schmid et al. ............ 526/160 |
| 5,569,634 A | 10/1996 | Miller et al. ............... 502/64 |
| 5,624,878 A | 4/1997 | Devore et al. ............. 502/152 |
| 5,633,419 A | 5/1997 | Spencer et al. ........... 585/522 |
| 5,643,847 A | 7/1997 | Walzer, Jr. ................ 502/117 |
| 5,714,424 A | 2/1998 | Warthen et al. ........... 502/105 |
| 5,733,439 A | 3/1998 | Holmgren ................ 208/111 |
| 5,753,577 A | 5/1998 | Hamura et al. ............ 502/113 |
| 5,807,800 A | 9/1998 | Shamshoum et al. ...... 502/104 |
| 5,807,938 A | 9/1998 | Kaneko et al. ........... 526/160 |
| 5,817,724 A | 10/1998 | Aoki et al. ................ 526/127 |
| 5,830,820 A | 11/1998 | Yano et al. ................ 502/62 |
| 5,866,663 A | 2/1999 | Brookhart et al. ......... 526/170 |
| 5,880,241 A | 3/1999 | Brookhart et al. ......... 526/348 |
| 5,880,323 A | 3/1999 | Brookhart, III et al. .... 585/527 |
| 5,886,224 A | 3/1999 | Brookhart et al. ......... 564/272 |
| 5,891,963 A | 4/1999 | Brookhart et al. ....... 525/326.1 |
| 5,928,982 A | 7/1999 | Suga et al. ................ 502/118 |
| 5,955,555 A | 9/1999 | Bennett ................... 526/133 |
| 5,973,084 A | 10/1999 | Suga et al. ............... 526/129 |
| 6,110,858 A | 8/2000 | Kaneko et al. ............ 502/62 |
| 6,133,138 A | 10/2000 | Ishibashi ................. 438/623 |
| 6,174,976 B1 | 1/2001 | Killian et al. ............. 526/172 |
| 6,184,171 B1 | 2/2001 | Shih ....................... 502/158 |
| 6,399,535 B1 | 6/2002 | Shih et al. ................ 502/167 |

FOREIGN PATENT DOCUMENTS

| | | | |
|---|---|---|---|
| DE | 19943936 | 9/1999 | ......... C08F/4/52 |
| EP | 57420 | 5/1986 | ......... C08F/10/02 |
| EP | 426637 | 5/1991 | ......... C08F/4/603 |
| EP | 426638 | 5/1991 | ......... C08F/4/602 |
| EP | 490226 | 6/1992 | ......... B01J/2/00 |
| EP | 546503 | * 5/1996 | ......... C08F/10/00 |
| EP | 849288 | 12/1997 | ......... C08F/10/00 |
| EP | 849292 | 6/1998 | ......... C08F/10/00 |
| EP | 874006 | 10/1998 | ......... C08F/10/00 |
| EP | 881232 | 12/1998 | ......... C08F/4/602 |
| JP | 2-78663 | 3/1990 | ......... C07D/213/53 |
| JP | 10-338516 | 12/1998 | ......... C01B/33/40 |
| JP | 11-292912 | 3/2000 | ......... C08F/4/52 |
| WO | WO 91/14713 | 10/1991 | ......... C08F/4/642 |
| WO | WO 92/00333 | 1/1992 | ......... C08F/10/00 |
| WO | WO 95/10548 | 4/1995 | ......... C08F/10/02 |
| WO | WO 95/11930 | 5/1995 | ......... C08F/10/02 |
| WO | WO 96/23010 | 8/1996 | ......... C08F/210/16 |

(List continued on next page.)

OTHER PUBLICATIONS

U.S. patent application Ser. No. 09/431,803, Shih, filed Nov. 1, 199.

(List continued on next page.)

*Primary Examiner*—Ling-Siu Choi
(74) *Attorney, Agent, or Firm*—Howard J. Troffkin; Robert Maggio

(57) ABSTRACT

A chromium containing catalyst wherein the chromium atom is in one of its higher valence states and is immobilized to a support-agglomerate composed of at least one inorganic oxide component and at least one ion-containing layered component.

54 Claims, 2 Drawing Sheets

FOREIGN PATENT DOCUMENTS

| WO | WO 97/19959 | 10/1996 | ............ C08F/4/603 |
|----|-------------|---------|--------------------------|
| WO | WO 97/48742 | * 12/1997 | ............ C08F/10/00 |
| WO | WO 97/48743 | 12/1997 | ............ C08F/10/00 |
| WO | WO 98/27124 | 6/1998 | ............ C08F/10/00 |
| WO | WO 98/30612 | 7/1998 | ............ C08F/10/06 |
| WO | WO 99/46302 | 9/1999 | ............. C08F/4/70 |
| WO | WO 99/46303 | 9/1999 | ............ C08F/10/00 |
| WO | WO 99/46304 | 9/1999 | ............. C08F/4/70 |
| WO | WO 01/25149 | 4/2001 | ......... C01B/33/154 |
| WO | WO 01/32721 | 5/2001 | ............ C08F/10/00 |
| WO | WO 01/32722 | * 5/2001 | ............ C08F/10/00 |
| WO | WO 01/42320 | 6/2001 | ............ C08F/10/00 |
| WO | WO 01/49747 | 7/2001 | ............. C08F/4/02 |

OTHER PUBLICATIONS

U.S. patent application Ser. No. 10/120,291, Shih, filed Apr. 10, 2002.

U.S. patent application Ser. No. 10/120,310, Shih et al., filed Apr. 10, 2002.

U.S. patent application Ser. No. 10/120,314, Shih et al., filed Apr. 10, 2002.

U.S. patent application Ser. No. 10/120,317, Shih, filed Apr. 10, 2002.

U.S. patent application Ser. No. 10/120,331, Shih, filed Apr. 10, 2002.

U.S. patent application Ser. No. 60/287,600, Shih et al., filed Apr. 30, 2001.

U.S. patent application Ser. No. 60/287,602, Shih et al., filed Apr. 30, 2001.

U.S. patent application Ser. No. 60/287,607, Shih et al., filed Apr. 30, 2001.

U.S. patent application Ser. No. 60/287,617, Shih et al., filed Apr. 30, 2001.

George J.P. Britovsek, Vernon C. Gibson, and Duncan F. Wass, Agnew. Chem. Int. Ed 1999, vol. 38, pp 428–447 "The Search for New–Generation Olefin Polymerization Catalysts: Life Beyond Metallocenes".

Pasquale Longo, Fabia Grisi, Antonio Proto, Adolfo Zambelli, "New Ni(II) based catalysts in the polymerization of olefins", Macromol. Rapid Commun. 19, 31–34 (1998).

Lynda K. Johnson, Stefan Mecking, and Maurice Brookhart, "Copolymerization of Ethylene and Propylene with Functionalized Vinyl Monomers by Palladium (II) Catalysts", 1996 American Chemical Society, vol. 118, No. 1, 1996.

Lynda K. Johnson, Christopher M. Killian, and Maurice Brookhart, "New Pd(II)– and Ni(II)–Based Catalysts for Polymerization of Ethylene and a–olefins", Journal American Chemical Society 1995, 177, 6414–6415.

"Novel polymerization reactions catalyzed by homogeneous Pd(II) and Ni(ii) a–diimino complexes", CatTech Highlights, Mar. 1997; p. 65–66.

"Move Over Metallocenes", Chemical Week, Apr. 29, 1998, p. 72.

"New Catalysts to Polymerize Olefins", C&EN, Apr. 13, 1998, pp 11–12.

Rip A. Lee, Rene J. Lachicotte, and Guillermo C. Bazan, "Zirconium Complexes of 9–Phenyl–9–borataanthracene. Synthesis, Structural Characterization, and Reactivity", Journal American Chemical Society 1998, 120, 6037–6046.

Brooke L. Small, Maurice Brookhart, and Alison M.A. Bennett, "Highly Active Iron and Cobalt Catalysts for the Polymerization of Ethylene", Journal American Chemical Society 1998, 120, 4049–4050.

John A. Ewen, Robert L. Jones, A. Razavi, "Syndiospecific Propylene Polymerizations with Group 4 Metallocenes", J. Am. Chem. Soc. 1988, 110, 6255–6256.

Thomas J. Pinnavaia "Intercalated Clay Catalysts", Science, Apr. 22, 1983, vol. 220, No. 4595, pp 365–371.

Yoshinori Suga, Eiji Isobe, Toru Suzuki, Kiyotoshi Fujioka, "Novel Clay Mineral–Supported Metallocene Catalysts For Olefin Polymerization," Publication Presentation at MetCon 99: "Polymers in Transition," Jun. 9–10, Houston, Texas, United States of America.

Nakamura, yuji et al., "Clay Column Chromatography for Optical Resolution: Partial Resolution of 1,1'–Binaphthol on Optically Active [Co(phen)3–x(am)x]n+–Montmorillonite Columns"; Clay Sci. (1990), 8(1), 17–23, XP000983072, p. 18.

* cited by examiner

HETEROGENEOUS CHROMIUM CATALYSTS AND PROCESSES OF POLYMERIZATION OF OLEFINS USING SAME

The present application is made with respect to co-pending U.S. provisional application Serial No. 60/287,601, filed on Apr. 30, 2001.

FIELD OF THE INVENTION

The present invention is directed to novel chromium-based catalysts and to an improved process for producing polyolefins, in particular polyethylene, by contacting an olefin monomer with the catalysts of the subject invention in a reaction zone, typically a single reaction zone, to provide a resultant polyolefin that exhibits bimodal molecular weight distribution.

BACKGROUND OF THE INVENTION

In the field of polyolefin manufacture, much attention has been devoted to finding new and improved catalysts capable of producing polyolefins having unique and/or improved properties or capable of providing such polyolefins in a more economical manner.

The best known industrially used catalyst systems for the polymerization of olefins are those of the "Ziegler-Natta catalyst" type and the "Phillips catalyst" type. The former comprises the reaction product of a metal alkyl or hydride of elements of the first three main groups of the Periodic Table and a reducible compound of a transition metal element of Groups 4 to 7. The combination used most frequently comprising an aluminum alkyl, such as diethylaluminum chloride, and titanium (IV) chloride. More recently, highly active Ziegler-Natta catalyst systems have been formed in which the titanium compound is fixed chemically to the surface of magnesium compounds, such as, in particular, magnesium chloride.

The Phillips Process for ethylene polymerization developed around Phillips catalyst that is composed of chromium oxide on silica as the support. This catalyst was developed by Hogan and Banks and described in U.S. Pat. No. 2,825,721, as well as A. Clark et al. in Ind. Eng. Chem. 48, 1152 (1956). Commercialization of this process provided the first linear polyalkenes and accounts for a large amount of the high-density polyethylene (HDPE) produced today.

More recent developments have focused on single-site catalyst systems. Such systems are characterized by the fact that their metal centers behave alike during polymerization to make very uniform polymers. Catalysts are judged to behave in a single-site manner when the polymer they make meets some basic criteria (e.g., narrow molecular weight distributions, or uniform comonomer distribution). Thus, the metal can have any ligand set around it and be classified as "single-site" as long as the polymer that it produces has certain properties. Includable within single-site catalyst systems are metallocene catalysts, and constrained geometry catalysts.

A "metallocene" is conventionally understood to mean a metal (e.g., Zr, Ti, Hf, Sc, Y, Vi or La) complex that is bound to two cyclopentadienyl (Cp) rings, or derivatives thereof, such as indenyl, tetrahydroindenyl, fluorenyl and mixtures. In addition to the two Cp ligands, other groups can be attached to the metal center, most commonly halides and alkyls. The Cp rings can be linked together (so-called "bridged metallocene" structure), as in most polypropylene catalysts, or they can be independent and freely rotating, as in most (but not all) metallocene-based polyethylene catalysts. The defining feature is the presence of two Cp ligands or derivatives thereof.

Metallocene catalysts can be employed either as so-called "neutral metallocenes" in which case an alumoxane, such as methylalumonxane, is used as an activator or they can be employed as so-called "cationic metallocenes" which incorporate a stable and loosely bound non-coordinating anion as a counter ion to a cationic metal metallocene center. Cationic metallocenes are disclosed in U.S. Pat. Nos. 5,064,802; 5,225,500; 5,243,002; 5,321,106; 5,427,991; and 5,643,847; and EP 426 637 and EP 426 638.

"Constrained geometry" is a term that refers to a particular class of organometallic complexes in which the metal center is bound by only one modified Cp ring or derivative. The Cp ring is modified by bridging to a heteroatom such as nitrogen, phosphorus, oxygen, or sulfur, and this heteroatom also binds to the metal site. The bridged structure forms a fairly rigid system, thus the term "constrained geometry." By virtue of its open structure, the constrained geometry catalyst can produce resins (long chain branching) that are not possible with normal metallocene catalysts.

The above-described single site catalyst systems are primarily based on early transition metal $d^0$ complexes useful in coordination polymerization processes. However, these catalysts are known to be oxophilic and, therefore, have low tolerance with respect to even small amounts of oxygenated impurities, such as oxygen, water and oxygenated hydrocarbons. Thus, these materials are difficult to handle and use.

More recently, late transition metal (e.g., Fe, Co, Ni, or Pd) bidentate and tridentate catalyst systems have been developed. Representative disclosures of such late transition metal catalysts are found in U.S. Pat. No. 5,880,241 and its divisional counterparts, U.S. Pat. Nos. 5,880,323; 5,866,663; 5,886,224; 5,891,963; 6,184,171; 6,174,976; 6,133,138; and PCT International Application Nos. PCT/US98/00316; PCT/IJS97/23556; PCT/GB99/00714; PCT/GB99/00715; and PCT/GB99/00716.

For polyethylene, and for high density polyethylene (HDPE) in particular, the molecular weight distribution (MWD) is a fundamental property which determines the properties of the polymer, and, thus, its applications. It is generally recognized in the art that the molecular weight distribution of a polyethylene resin can principally determine the physical, and in particular, the mechanical properties of the resin. Further, the provision of different molecular weight polyethylene molecules can significantly affect the Theological properties of the polyethylene as a whole.

Since an increase in the molecular weight normally improves the physical properties of polyethylene resins, there is a strong demand for polyethylene having high molecular weight. However, it is the high molecular weight molecules that render the polymers more difficult to process. On the other hand, a broadening or preferably a bimodal molecular weight distribution tends to improve the flow of the polymer when it is being processed at high rates of shear. Accordingly, in applications requiring a rapid transformation resulting in high expansion of the material through a die, for example in blowing and extrusion techniques, having a bimodal molecular weight distribution permits an improvement in the processing of polyethylene at high molecular weight (this being equivalent to a low melt index, as is known in the art). It is known that when the polyethylene has a high molecular weight and also a bimodal molecular weight distribution, the processing of the polyethylene is made easier as a result of the low molecular weight portion and also the high molecular weight portion contributes to a good impact resistance for the polyethylene film. A polyethylene of this type may be processed utilizing less energy with higher processing yields.

It is known in the art that it is not practical to prepare a polyethylene having a bimodal molecular weight distribution and the required properties simply by mixing polyethylenes having different molecular weights.

As discussed above, high-density polyethylene consists of high and low molecular weight fractions. The high molecular weight fraction provides good mechanical properties to the high density polyethylene and the low molecular weight fraction is required to give good processability to the high density polyethylene, the high molecular weight fraction having relatively high viscosity which can lead to difficulties in processing such a high molecular weight fraction.

On the other hand, a bimodal molecular weight distribution provides a composite of high and low glass transition temperature weight fractions. Such bimodal weight distribution polymer composition provides desired material that exhibits good processability while providing a tough, resilient material which, as an example, exhibits high environmental stress cracking resistance (ESCR). The ESCR of polymers desirably will be greater than 200 hours, such as 500 hours or more and more preferably from about 1000 to 10,000 hours when tested under known procedure ASTM D-1693-70, Condition B.

It is accordingly recognized in the art that it is desirable to provide and utilize polyolefins having bimodal molecular weight distribution. Such distribution is normally shown by a graph of the molecular weight distribution, as determined, for example, by gel permeation chromatography. Generally, the molecular weight distribution is defined by a parameter, known as the dispersion index D, which is the ratio between the weight average molecular weight (Mw) and the number average molecular weight (Mn). The dispersion index constitutes a measure of the breath of the molecular weight distribution. For most applications, the dispersion index varies between 10 and 30.

A truly bimodal distribution curve of a polymer exhibits two peaks which may have substantially equal amplification. In this instance, the polymer composition has substantial amounts of polymer forming a high and a low molecular weight distribution. Alternatively, the resultant molecular weight distribution curve may exhibit a single major peak having a shoulder or smaller second peak on one side of the major peak. Such a curve is provided from polymer compositions having one major polymer distribution with a minor amount of a second polymer distribution. This latter material sometimes designated as being mono-modal.

The manufacture of bimodal polyethylene is known in the art. One method to achieve a bimodal distribution uses two active catalyst species which provide two different catalytic properties and establish two different active sites. Those two sites in turn catalyze two distinct reactions for the production of the two polymers to enable the bimodal distribution to be achieved. In another method, as has been known for many years and exemplified by EP-A-0057420, the commercial production of bimodal high-density polyethylene is carried out by a two step process, using two reactors in series. In the two step process, the process conditions and the catalyst can be optimized in order to provide a high efficiency and yield for each step in the overall process.

In WO-A-95/10548 and WO-A-95/11930, it was proposed to use a Ziegler-Natta catalyst to produce polyethylene having a bimodal molecular weight distribution in a two-stage polymerization process in two liquid full loop reactors in series. In the polymerization process, a comonomer is fed into the first reactor and the high and low molecular weight polymers are produced in the first and second reactors respectively. The introduction of comonomer into the first reactor leads to the incorporation of the comonomer into the polymer chains in turn leading to the relatively high molecular weight fraction being formed in the first reactor. In contrast, no comonomer is deliberately introduced into the second reactor and instead a higher concentration of hydrogen than used in the first reactor is present in the second reactor to enable the low molecular weight fraction to be formed therein.

These prior processes suffer from the technical disadvantages that some unreacted comonomer can pass through from the first reactor to the second reactor, thereby reacting with the ethylene monomer therein leading to an increase in the molecular weight of the fraction produced in the second reactor. This in turn can deteriorate the bimodality of the molecular weight distribution leading to a reduction in the mechanical properties of the resultant polymer product. Further, such two-step processes require maintaining and controlling two separate reactors, which is more labor intensive and can, thereby, increase production costs.

More recently, U.S. Pat. No. 5,714,424 directs one to utilize a catalyst that is a monolithic multi-component composite particle. The composite is formed by physically blending at least two distinct supported catalyst components (each having the capability of producing polymer with distinctly different melt index values under the same polymerization conditions) and forming a combined monolithic particulate catalyst material having each of the supported catalyst components therein. The composite requires initially forming each of the distinct support catalysts to be used and then further processing these catalysts into the final monolithic form. Such composite catalysts may merely cause a broadening of the molecular weight distribution, as exhibited by a molecular weight distribution curve having a single peak and a broad range of differing molecular weight material. Due to differing catalytic activity of each individual catalyst forming a part of the composite particles, any bimodal distribution would be small and would not necessarily provide a polymer having the capacity to exhibit good processability while providing a tough, resilient product.

In addition to realization of the desired product properties, other factors influence the efficiency of a catalyst system, such as the activity of the catalyst system, that is to say the amount of catalyst required for economic conversion of a given amount of olefin, the product conversion per unit time and the product yield.

An additional factor to be considered is the ability to utilize the catalyst in a heterogeneous catalyst system. The advantages of a heterogeneous catalyst system are more fully realized in a slurry polymerization process, of which the Phillips Process is but one example. More specifically, slurry polymerizations are often conducted in a reactor wherein monomer, catalysts, and diluent are continuously fed into the reactor. The solid polymer that is produced is not dissolved in the diluent but is allowed to settle out before being periodically withdrawn from the reactor. In this kind of polymerization, factors other than activity and selectivity, which are always present in solution processes, become of paramount importance.

For example, in the slurry process it is desired to have a supported catalyst that produces relatively high bulk density polymer. If the bulk density is too low, the handling of the solid polymer becomes impractical. It is also an advantage to have the polymer formed as uniform, substantially spherical particles that are relatively free of fines. Although fines can have a sufficiently high bulk density, they also do not settle as well as larger particles and they present additional handling problems with the later processing of such polymer "fluff".

Furthermore, slurry polymerization processes differ in other fundamental ways from typical solution polymerization processes. Solution polymerization is normally conducted at high reaction temperatures (>130° C.) and pressure (>450 psi) which often results in lower molecular weight polymers. The lower molecular weight is attributed to the rapid chain-termination rates under such reaction conditions. Although lowering the reaction temperature and/or pressure, or changing molecular structure of the catalyst in a solution process may produce higher molecular weight polymers, it becomes impractical to process the resulting high molecular weight polymers in the downstream equipment due to the high solution viscosity.

In contrast, a slurry reaction process overcomes many of the above disadvantages by simply operating at lower temperature (<110° C.). As a result, polymer with a uniform particle size and morphology can be routinely obtained. It is also advantageous to carry out slurry reactions with sufficiently high polymerization efficiencies such that residues from the polymerization catalysts do not have to be removed from the resulting polymers.

Examples of materials which are useful as a catalyst support component are described in WO97/48743 directed to spray-dried agglomerates of silica gel of controlled morphology and in U.S. Pat. Nos. 5,395,808; 5,569,634; 5,403,799; 5,403,809 and EP 490,226 directed to formation of particles of bound clay by spray drying.

Supported catalyst systems are described in U.S. Pat. No. 5,633,419, which describes the use of spray-dried silica gel as a support for Ziegler-Natta catalyst systems; U.S. Pat. No. 5,362,825 directed to supported Ziegler-Natta catalysts formed by contacting a pillared clay material with a Ziegler-Natta catalyst composition; U.S. Pat. No. 5,807,800 directed to a supported metallocene catalyst formed by contacting a particulate support with a formed stereospecific metallocene ligand; U.S. Pat. No. 5,238,892 directed to use of undehydrated silica as support for metallocene and activator; and U.S. Pat. No. 5,308,811 directed to formation of supported metallocene-type transition metal compound by contacting it with a clay and an organoaluminum compound.

WO 0125149 A2 discloses a composition comprising an acid treated cation exchanging layered substrate material dispersed in silica gel as a support for a metallocene polymerization catalyst. Acidification is accomplished using a Bronsted acid such as sulfuric acid or an acidified amine, e.g., ammonium sulfate in a mixture with alkaline metal silicate such that the latter precipitates as silica hydrogel. The resulting slurry is dried, e.g., spray dried, and contacted with a metallocene catalyst. Preferably the layered silicate material is fully acid exchanged.

WO 0149747A1 discloses a supported catalyst composition comprising an organoaluminum compound, an organometal compound and an oxide matrix support wherein the latter is a mixture of an oxide precursor compound such as a silica source and a substantially decomposed (exfoliated) layered mineral such as a clay. Decomposition of the clay is achieved, for example, by solvent digestion in a strong acidic and basic medium at elevated temperatures combined with high energy or high shear mixing to product a colloidal suspension. Decomposition (exfoliation) converts the material to its residual mineral components and is said to be complete when the layered mineral no longer has its original layered structure.

WO 0142320 discloses a clay or expanded clay useful as a polymerization catalyst support. The support comprises the reaction product of the clay or expanded clay with an organometallic, or organometalloid, compound in order to reduce, cap or remove residual hydroxyl or other polar functionality of the clay and replace such groups with the organometallic compound. An organometallic or organometalloid derivative is bound to the support through the support oxygen or other polar functionality. Prior to reaction with the organometallic compound, the clay can be ion exchanged to replace at least a portion of alkali or alkali earth metal cations, e.g. sodium or magnesium, originally present in the clay. The chemically modified clay may be calcined either before or after treatment with the organometallic compound; prior treatment is preferred. The organometallic or organometalloid compound contains Mg, Zn or boron, preferably Zn, and the organic group preferably is a $C_1$–$C_{10}$ alkyl.

The teachings of intercalated clays as support materials for catalytic compositions include: U.S. Pat. No. 5,753,577 (directed to a polymerization catalyst comprising a metallocene compound, a co-catalyst such as proton acids, ionized compounds, Lewis acids and Lewis acidic compounds, and a clay mineral); U.S. Pat. No. 5,399,636 (directed to a composition comprising a bridged metallocene which is chemically bonded to an inorganic moiety such as clay or silica); EP 849,292 (directed to an olefin polymerization catalyst consisting essentially of a metallocene compound, a modified clay compound, and an organoaluminum compound); U.S. Pat. No. 5,807,938 (directed to an olefin polymerization catalyst obtained by contacting a metallocene compound, an organometallic compound, and a solid component comprising a carrier and an ionized ionic compound capable of forming a stable anion on reaction with the metallocene compound); U.S. Pat. No. 5,830,820 and EP 881,232 (directed to an olefin polymerization catalyst comprising a metallocene compound, and an organoaluminum compound and a clay mineral which has been modified with a compound capable of introducing a cation into the layer interspaces of the clay); EP 849,288 (discloses an olefin polymerization catalyst consisting essentially of metallocene compound, an organoaluminum compound, and a clay compound that has been modified with a proton acid); and U.S. Pat. No. 4,761,391 (directed to delaminated clays whose x-ray diffraction patterns do not contain a distinct first order reflection. These clays are made by reacting swelling clays with a pillaring agent. The ratio of clay to pillaring agents is disclosed to be between about 0.1 and about 10. To obtain the delaminated clay, a suspension of swelling clay, having the proper morphology, e.g., colloidal particle size, is mixed with a solution or a suspension of the pillaring agent at the ratios described above.)

Additional patents that disclose intercalated clays are U.S. Pat. Nos. 4,375,406; 4,629,712; and 4,637,992. Additional patents that disclose pillared clays include U.S. Pat. Nos. 4,995,964 and 5,250,277.

U.S. Ser. No. 4/431,803 filed on Nov. 1, 1999, by Keng-Yu Shih discloses the use of silica agglomerates as a support for transition metal catalyst systems employing specifically controlled (e.g., very low) amounts of non-abstracting aluminum alkyl activators.

U.S. Ser. No. 09/431,771, filed on Nov. 1, 1999, by Keng-Yu Shih et al. discloses a coordination catalyst system comprising a bidentate or tridentate pre-catalyst transition metal compound, at least one support-activator, e.g., spray dried silica/clay agglomerate, and optionally an organometallic compound and methods for their preparation.

U.S. Ser. No. 09/432,008, filed on Nov. 1, 1999, by Keng-Yu Shih et al. discloses a coordination catalyst system comprising a metallocene or constrained geometry pre-catalyst transition metal compound, at least one support-activator, e.g., spray dried silica/clay agglomerate, and optionally an organometallic compound and methods for their preparation.

U.S. provisional application Serial No. 60/287,607, filed on Apr. 30, 2001, discloses a process for forming a catalyst composition comprising substantially simultaneously contacting at least one bidentate ligand compound or at least one tridentate ligand compound or mixtures thereof with a transition metal compound and with a support-activator agglomerate comprising (A) at least one inorganic oxide component, and (B) at least one ion-containing layered component. The reference further is directed to the resultant catalyst composition for which the support-activator agglomerate functions as the activator for the catalyst system.

U.S. provisional application Serial No. 60/287,602, filed on Apr. 30, 2001, discloses a catalyst composition composed of a support-activator agglomerate comprising (A) at least one inorganic oxide component, and (B) at least one ion-containing layered component. The agglomerate provides a support-activator agglomerate for a combination of catalysts comprising at least one metallocene catalyst and at least one coordination catalyst of a bidentate or tridentate pre-catalyst transition metal compound.

U.S. provisional application Serial No. 60/287,617, filed on Apr. 30, 2001, discloses a process for forming a catalyst composition comprising substantially simultaneously contacting at least one bidentate ligand compound or at least one tridentate ligand compound or mixtures thereof with a transition metal compound and with a support-agglomerate comprising (A) at least one inorganic oxide component, and (B) at least one ion-containing layered component and the agglomerate has chromium atoms immobilized thereto. The reference is further directed to the resultant catalyst composition for which the support-agglomerate functions as the activator for the catalyst system.

U.S. provisional application Serial No. 60/287,600, filed on Apr. 30, 2001, discloses a catalyst composition composed of a support-agglomerate comprising (A) at least one inorganic oxide component, and (B) at least one ion-containing layered component and the agglomerate has chromium atoms immobilized thereon. The agglomerate provides a support for at least one coordination pre-catalyst comprising a transition metal bidentate or tridentate ligand containing complex.

In addition, the following U.S. patent applications having Ser. No. 10/120,291; Ser. No. 10/120,317; Ser. No. 10/120,331; Ser. No. 10/120,310; Ser. No. 10/120,314 are concurrently filed with the subject application. The teachings of each of the above provisional and concurrently filed applications are incorporated herein in its entirety by reference.

Thus, there has been a continuing search to develop catalyst systems that demonstrate high catalyst activity, are readily formed in an inexpensive and efficient manner, and allows the polymerization process to be conducted as a cost effective one-step polymerization reaction. Further, there has also been a particular need to discover catalysts that can provide polymers, in particular polyolefins (e.g., polyethylene) having bimodal molecular weight distribution in a single step reaction and to polymers resulting therefrom which can be readily processed to form products exhibiting toughness and resiliency.

SUMMARY OF THE INVENTION

The present invention is directed to a unique and novel supported chromium catalyst composition.

Further, the present invention is directed to polymerization processes, which utilize the present catalyst to produce polymers, in particular polyolefins, having bimodal molecular weight distribution.

Still further, the present invention is directed to a polymerization process, which utilizes the present catalyst to produce bimodal polymer product in a single polymerization step.

More specifically, the present invention is directed to supported chromium catalysts wherein the chromium atom is immobilized to agglomerates formed from at least two components, namely (A) at least one inorganic oxide component and (B) at least one ion-containing layered component, as fully described herein below.

Moreover, the supported chromium catalyst can be used in combination with other catalyst species, such as metallocene, constrained geometry, bidentate or tridentate ligand containing compounds and mixtures thereof wherein the catalyst specie is present on a support in the form of an agglomerates formed from at least two components, namely (A) at least one inorganic oxide component and (B) at least one ion-containing layered component, which may optionally have chromium atoms bonded thereto.

DETAILED DESCRIPTION

Figure 1:
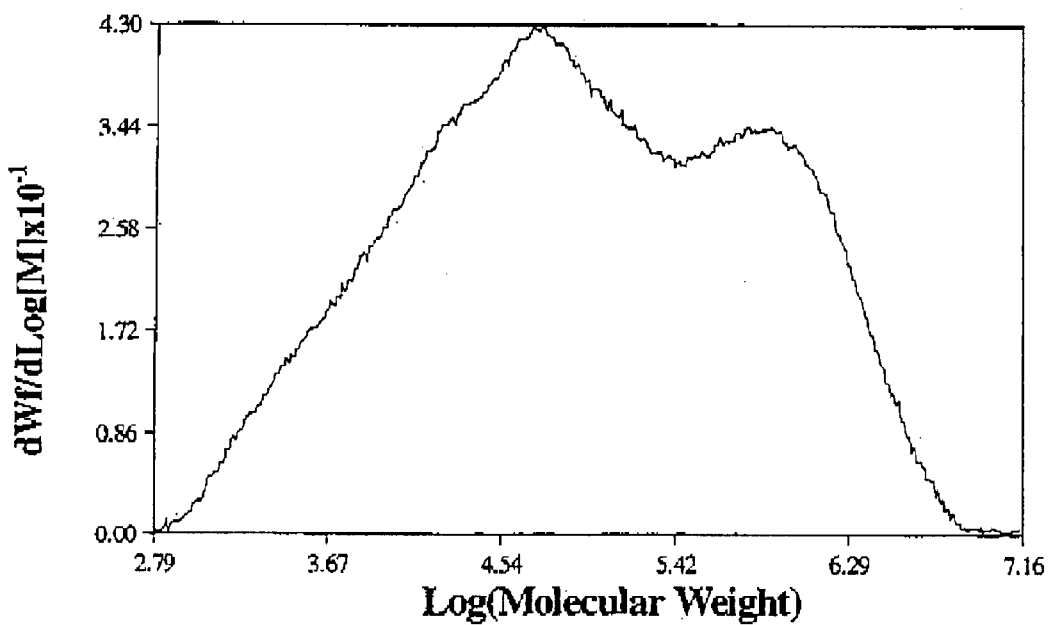
FIG. 1 is a graphic depiction of the bimodal molecular weight distribution of the polymer resulting from the polymerization of ethylene using the Chromium support-agglomerate catalyst of Sample 1. The graph represents the log of the polymer molecular weight versus dWf/dLog[M]× $10^{-1}$.

The present invention is directed to the formation and composition of a supported chromium catalyst composition wherein the chromium atom is immobilized in a support-agglomerate. Further, the present invention is directed to the utilization of the present supported chromium composition as a catalyst to produce polymers, in particular polyolefins, having bimodal molecular weight distribution.

The term "immobilized" as used herein and in the appended claims with reference to the incorporation of chromium atoms as part of the subject support-agglomerate refers to physical or chemical adsorption (adhesion to the surface of the support-agglomerate) and/or absorption (penetration into the inner structure of the support-agglomerate), preferably by chemadsorption and/or chemabsorption of the chromium atoms generated from the chromium atom containing precursor, as described below, on and/or into the support-agglomerate. Without wishing to be bound to any particular theory, it is believed that the chromium atom forms a bond with the surface atoms of the support-agglomerate. The nature of such bonds may be ionic, dative and/or covalent. For example, the chromium atom may be covalently bonded to oxygen atoms at the surface of the particles of support-agglomerate and/or as part of the interior of such particles. Such immobilization may take place by formation of a solution or suspension of the subject support-agglomerate and a chromium atom containing precursor species followed by reaction of the precursor species with residual hydroxyl groups contained in the support-agglomerate, such as associated with the inorganic oxide Component (A) of the support-agglomerate.

The support used to prepare the present catalyst composition is a composite in the form of agglomerates of at least two components, namely, (A) at least one inorganic oxide component and (B) at least one ion-containing layered component.

More specifically, the support-agglomerate used to prepare the catalyst of the present invention is in the form of a composite of: (A) at least one inorganic oxide component selected from $SiO_2$, $Al_2O_3$, MgO, $AlPO_4$, $TiO_2$, $ZrO_2$ or mixed oxides and (B) at least one ion containing layered material having interspaces between the layers and capable of exhibiting Lewis acidity, said layered material having a cationic component and an anionic component, wherein said cationic component is present within the interspace of the layered material, and said layered material is intimately dispersed with said inorganic oxide component within the agglomerate.

The inorganic oxide Component (A) of the support-agglomerate particles of the present invention are derived from porous inorganic oxides including $SiO_2$, $Al_2O_3$, $AlPO_4$, MgO, $TiO_2$, $ZrO_2$; as well as mixed inorganic oxides including $SiO_2.Al_2O_3$, $MgO.SiO_2$ $MgO.SiO_2.Al_2O_3$, $SiO_2.TiO_2$, $SiO_2.TiO_2.Al_2O_3$, $SiO_2.Cr_2O_3.Al_2O_3$ and $SiO_2.Cr_2O_3.TiO_2$. Where the inorganic oxide (including mixed inorganic oxides) is capable of forming a gel by known commercial procedures, it is preferred to utilize the same in a gel configuration for the milling procedures described herein. If the inorganic oxide is not susceptible to gel formation, the free oxide or mixed oxides derived from other conventional techniques, such as precipitation, coprecipitation, or just admixing, can be utilized directly for the milling procedures after washing.

Most preferably, Component (A) of the support-agglomerate contains typically at least 80, preferably at least 90, and most preferably at least 95%, by weight, silica gel (e.g., hydrogel, aerogel, or xerogel) based on the weight of the catalyst support.

Silica hydrogel, also known as silica aquagel, is a silica gel formed in water which has its pores filled with water. A xerogel is a hydrogel with the water removed. An aerogel is a type of xerogel from which the liquid has been removed in such a way as to minimize any collapse or change in the structure as the water is removed.

Silica gel is prepared by conventional means, such as by mixing an aqueous solution of an alkali metal silicate (e.g., sodium silicate) with a strong acid, such as nitric or sulfuric acid. The mixing is done under suitable conditions of agitation to form a clear silica sol which sets into a hydrogel in less than about one-half hour. The resulting gel is then washed. The concentration of the $SiO_2$ in the hydrogel which is formed is usually in the range of typically between about 15 and about 40, preferably between about 20 and about 35, and most preferably between about 30 and about 35 weight percent, with the pH of that gel being from about 1 to about 9, preferably 1 to about 4. A wide range of mixing temperatures can be employed, this range being typically from about 20 to about 50° C.

Washing is accomplished simply by immersing the newly formed hydrogel in a continuously moving stream of water which leaches out any undesirable salts, leaving about 99.5 wt. % pure silica ($SiO_2$) behind. The pH, temperature, and duration of the wash water will influence the physical properties of the silica, such as surface area (SA) and pore volume (PV). Silica gel washed at 65–90° C. at a pH of between 8–9 for 28–36 hours will usually have a SA of between 290–350 $m^2$/g and form aerogels with a PV of 1.4 to 1.7 cc/gm. Silica gel washed at a pH of between 3–5 at 50–65° C. for 15–25 hours will have a SA of between 700–850 $m^2$/g and form aerogels with a PV of between 0.6–1.3 cc/g When employing a Component (A) inorganic oxide containing at lest 80 wt. % silica gel, the remaining balance of the inorganic oxide Component (A) can comprise various additional components. These additional components may be of two types: namely (1) those which are intimately incorporated into the gel structure upon formation, e.g., by cogelling silica gel with one or more other gel forming inorganic oxide materials, and (2) those materials which are admixed with silica gel particles prior to milling or after milling in slurry form just prior to spray drying. Thus, materials includable in the former category are silica-alumina, silica-titania, silica-titania-alumina, and silica-alumina-phosphate cogels.

The chromium precursor salt component described fully herein below can be made part of the gel structure by admixing the chromium precursor with the silica hydrogel prior to milling and/or just prior to agglomeration by spray drying. The chromium precursor salt as well as other non-silica gel components employed with silica gel may be added at any time to the slurry to be agglomerated. However, it is preferable that they be present in the silica gel during or prior to milling as described hereinafter, since they will be less likely to disturb the desired agglomerate morphology after spray drying when they are also subjected to milling.

In addition, other components of type (2) above, may also be admixed, in slight proportion, with the silica hydrogel prior to milling and/or prior to spray drying include those prepared separately from inorganic oxides, such as magnesium oxide, titanium oxide, thorium oxide, e.g., oxides of Groups 4 and 16, as well as other particulate constituents. Other particulate constituents which may be present include those constituents having catalytic properties, not adversely affected by water, spray drying or calcination, such as finely divided oxides or chemical compounds, recognizing, however, that these constituents play no part in the agglomeration procedure. Similarly, it is possible to add powders or particles of other constituents to the silica hydrogel particles to impart additional properties to the support-agglomerate obtained. Accordingly, in addition to those powders or particulates having catalytic properties, there may be added materials that possess absorbent properties, such as synthetic zeolites.

It is also feasible to add constituents to the inorganic oxide which may be eliminated after agglomeration in order to control porosity within a desired range. Such agents include sulfur, graphite, wood charcoal, and the like being particularly useful for this purpose.

In view of the above, the term "silica gel", when used to describe the process steps up to and including agglomeration, is intended to include the optional inclusion of the aforementioned non-silica gel constituents permitted to be present in Component (A) of the support-agglomerate.

Component (B) forming the support-agglomerate is a layered material having a three-dimensional structure, which exhibits the strongest chemical bonds in only two dimensions. More specifically, the strongest chemical bonds are formed in and within two dimensional planes which are stacked on top of each other to form a three dimensional solid. The two dimensional planes are held together by weaker chemical bonds than those holding an individual plane together and generally arise from Van der Waals forces, electrostatic interactions, and hydrogen bonding. The electrostatic interactions are mediated by ions located between the layers and, in addition, hydrogen bonding can occur between complimentary layers or can be mediated by interlamellar bridging molecules.

Representative examples of suitable layered materials includable in layered Component (B) can be either amorphous or crystalline. Suitable layered Component (B) materials include clay, and clay minerals.

Clay is typically composed of clay minerals (i.e., crystalline silicate salts) as the main constituent. The clay or clay mineral is usually an inorganic polymeric compound of high molecular complexity constituted by a tetrahedral unit in which a central silicon atom coordinates oxygen atoms and an octahedral unit in which a central aluminum, magnesium or iron atom coordinates oxygen or hydroxide. The skeletal structures of many clays or clay minerals are not electrically neutral and have positive, or more typically, negative charges on their surfaces. When possessing a negatively charged surface, they have cations in their interlaminar structures to complement such negative charges. Such interlaminar cations can be ion-exchanged by other cations. A quantification of a clay's ability to exchange interlaminar cations is called its cation exchange capacity (CEC) and is represented by milliequivalents (meq) per 100 g of clay. CEC differs depending upon the type of clay, and Clay Handbook, second edition (compiled by Japanese Clay Association, published by Gihodo Shuppan K.K.) gives the following information. Kaolinite: 3 to 15 meq/100 g, halloysite: 5 to 40 meq/100 g, montmorillonite: 80 to 150 meq/100 g, illite: 10 to 40 meq/100 g, vermiculite: 100 to 150 meq/100 g, chlorite: 10 to 40 meq/100 g, zeolite• attapulgite: 20 to 30 meq/100 g. Thus, layered Component (B) to be used in the present invention, is a material, e.g., clay or clay mineral, typically having its surface negatively charged and preferably also having the ability to exchange cations, as with a Lewis acid.

Thus, clay minerals generally have the characteristic layer structure described above has various levels of negative charges contained between the layers. In this respect, the clay mineral is substantially different from metal oxides having a three-dimensional structure such as silica, alumina, and zeolite. The clay minerals are classified according to the levels of the aforementioned negative charge for the chemical formula: (1) biophilite, kaolinite, dickalite, and talc having the negative charge of 0 (zero), (2) smectite having the negative charge of from −0.25 to −0.6, (3) vermiculite having the negative charge of from −0.6 to −0.9, (4) mica having the negative charge of from about −1, and (5) brittle mica having a negative charge of about −2. Each of the above groups includes various minerals. For example, the smectite group includes montmorillonite, beidellite, saponite, nontronite, hectorite, teniolite, suconite and related analogues; the mica group includes white mica, palagonite and illite. These clay minerals exist in nature, and also can be synthesized artificially with a higher purity.

Any of the natural and artificial clay minerals having a negative charge below 0 are useful in the present invention. The presently preferred clay are of the smectite family, such as the preferred montmorillonite, e.g., sodium montmorillonite.

Further, clays and clay minerals may be used as they are without subjecting them to any treatment prior being used in the formation of the support-agglomerate used in forming the subject catalyst. Alternatively, they may be treated by ball milling, sieving, acid treatment or the like prior to such formation. Further, they may be treated to have water added and adsorbed or may be treated for dehydration under heating before support formation. They may be used alone or in combination as a mixture of two or more of them for support-agglomeration synthesis.

Component (B) preferably has pores having a diameter of at least 40 Å (e.g., 40–1000 Å) as measured by a mercury intrusion method employing a mercury porosimeter of at least 0.1 cc/g, more preferably from 0.1 to 1 cc/g. The average particle size of Component (B) can vary typically from about 0.01 to about 50, preferably from about 0.1 to about 25, and most preferably from about 0.5 to about 10 microns.

Although such treatments are not preferred or required to obtain the benefits of the present invention and, therefore, may be excluded, the clays suitable for use as Component (B) of the support-agglomerate may be subjected to pretreatment with chemicals prior or subsequent to support formation. Examples of the chemical pretreatment include treatment with an acid or alkali, treatment with a salt, and treatment with an organic or inorganic compound. The last treatment can result in formation of a composite material.

The treatment of the clay-silica mixture with the acid or alkali may not only remove impurities from the mineral, but also may elute part of metallic cations from the crystalline structure of the clay, or may destructively alter the crystalline structure into an amorphous structure.

Examples of the acids used for this purpose are Bronstead acids, such as hydrochloric, sulfuric, nitric, acetic acid and the like. Sodium hydroxide, potassium hydroxide and calcium hydroxide are preferably used as alkali chemical in the alkali pretreatment of the clay mineral.

In the case where the clay mineral is pretreated with a salt or an inorganic, or organic compound to give a composite material, the crystalline structure may be retained substantially without being broken and, rather a product that has been modified by ion-exchange may be obtained. Examples of the inorganic salt compounds that may be used in the pretreatment with salts include ionic halide salts, such as sodium chloride, potassium chloride, lithium chloride, magnesium chloride, aluminum chloride, iron chloride and ammonium chloride; sulfate salts, such as sodium sulfate, potassium sulfate, aluminum sulfate and ammonium sulfate; carbonate salts, such as potassium carbonate, sodium carbonate and calcium carbonate; and phosphate salts, such as sodium phosphate, potassium phosphate, aluminum phosphate and ammonium phosphate. Examples of the organic salt compounds include sodium acetate, potassium acetate, potassium oxalate, sodium citrate, sodium tartarate and the like.

As examples of the inorganic compound used for the synthesis of inorganic composite material, metal hydroxides that yield hydroxide anions, for example, aluminum hydroxide, zirconium hydroxide, chromium hydroxide and the like may be mentioned.

In the case where the clay mineral is treated with an organic compound, such compounds will typically comprise a Lewis basic functional group containing an element of the Group 15 or 16 of the Periodic Table, such as organoammonium cation, oxonium cation, sulfonium cation, and phosphonium cation. The organic compound may also preferably comprise a functional group other than the Lewis basic functional group, such as carbonium cation, tropylium cation, and a metal cation. After undergoing such treatment, the exchangeable metallic cations originally present in the clay mineral are exchanged with the enumerated organic cations. Thus, compounds that yield a carbon cation, for example, trityl chloride, tropylium bromide and the like; or a complex compound that yields metallic complex cation, for example a ferrocenium salt and the like; may be used as the organic compound in the pretreatment. In addition to these compounds, onium salts may be used for the same purpose.

Particular examples of guest organic cations that may be introduced for modification of the clay minerals, include: triphenylsulfonium, trimethylsulfonium, tetraphenylphosphonium, alkyl tri(o-tolyl) phosphonium, triphenylcarbonium, cycloheptatrienium, and ferrocenium; ammonium ions, for example aliphatic ammonium cations, such as butyl ammonium, hexyl ammonium, decyl ammonium, dodecyl ammonium, diamyl ammonium, tributyl ammonium, and N, N-dimethyl decyl ammonium; and aromatic ammonium cations such as anilinium, N-methyl anilinium, N,N-dimethyl anilinium, N-ethyl anilinium, N,N-diethyl anilinium, benzyl ammonium, toluidinium, dibenzyl ammonium, tribenzyl ammonium, N,N-2,4,6-pentamethyl anilinium and the like; and also oxonium ions, such as dimethyl oxonium, diethyl oxonium and the like. These examples are not limiting.

Ion exchange of the exchangeable cations in the clay mineral with selected organic cations is typically brought about by contacting the clay with an onium compound (salt) comprising the organic cations.

Particular examples of the onium salts which may be used, include: ammonium compounds; for example aliphatic amine hydrochloride salts, such as propylamine HCl salt, isopropylamine HCl salt, butylamine HCl salt, hexylamine HCl salt, decylamine HCl salt, dodecylamine HCl salt, diamylamine HCl salt, tributylamine HCl salt, triamylamine HCl salt, N,N-dimethyl decylamine HCl salt, N,N-dimethyl undecylamine HCl salt and the like; aromatic amine hydrochloride salts, such as aniline HCl salt, N-methylaniline HCl salt, N,N-dimethylaniline HCl salt, N-ethylaniline HCl salt, N,N-diethylaniline HCl salt, o-toluidine HCl salt, p-toluidine HCl salt, N-methyl-o-toluidine HCl salt, N-methyl-p-toluidine HCl salt, N,N-dimethyl-o-toluidine HCl salt, N,N-dimethyl-p-toluidine HCl salt, benzylamine HCl salt, dibenzylamine HCl salt, N,N-2,4,6-pentamethyl aniline HCl salt and the like; hydrofluoric, hydrobromic and hydroiodic acid salts and sulfate salts of the above-listed aliphatic and aromatic amines; and oxonium compounds, such as hydrochloric acid salts of methyl ether, ethyl ether, phenyl ether and the like. Of the onionium compounds the exemplified ammonium or oxonium compounds, preferably the ammonium compounds and more preferably the aromatic amine salts are employed in the modification of the clay mineral.

The onium compound to be reacted with the clay mineral may be in the isolated form. Alternatively, the onium compound may be formed in situ, for example by contacting the corresponding amine compound, a heteroatom-containing compound, such as an ether or sulfide compound, and a proton acid, such as hydrofluoric, hydrochloric, hydroiodic or sulfuric acid, in the reaction solvent in which the clay mineral is to be pretreated subsequently. The reaction conditions under which the clay mineral can be modified by the onium compound are not critical. Also the relative proportions of the reactants used therein are not critical. Preferably, however, when used the onium compound is employed in a proportion of not less than 0.5 equivalents per equivalent of the cation present in the clay mineral, and more preferably in a proportion of at least equivalent amount. The clay mineral may be used singly or in admixture with other clay mineral or minerals. Also the onium compound may be used singly or in admixture with other onium compounds.

The reaction solvent used in the modification pretreatment process may be water or a polar organic solvent. Examples of the organic solvents which may be used suitably, include alcohols, such as methanol, ethanol, propanol, butanol and the like; acetone, tetrahydrofuran, N,N-dimethyl formamide, dimethylsulfoxide, methylene chloride and the like. The solvent may be used singly or as a mixture of two or more solvents. Preferably, water or an alcohol is employed.

What can be viewed as separate and distinct classes of chemical modification treatments to which the clays can be subjected is referred to as pillaring and delamination. Pillaring is a phenomena whereby the platelets of certain clays, such as smectite clays, which are swellable, are separated by intercalation of large guest cations between the negatively charged platelet sheets, which cations function as molecular props or pillars separating the platelets and preventing the layers from collapsing under Van der Waals forces.

Pillared clays are typically prepared by reacting a smectite clay, such as montmorillonite, with polyoxymetal cations such as polyoxycations of aluminum and zirconium. The reaction product is normally dried in air and calcined to convert the intercalated cations into metal oxide clusters interposed between the platelets of the clay such that the spacing between the platelets ranges from about 6 to about 10 Angstroms and is maintained at such values when the clay is heated to a temperature between about 500° C. and 700° C. When the reaction product is dried, the clay platelets, which are propped apart by the metal oxide clusters, orient themselves face-to-face, thereby forming a lamellar structure which yields an X-ray diffraction pattern containing distinct first order or (001) reflection. The extent of lamellar ordering is indicated by the X-ray powder diffraction pattern of the pillared clay. A well ordered, air-dried, pillared montmorillonite may exhibit six or more orders of reflection. Pillared clays and their preparation are described more fully in the article entitled "Intercalated Clay Catalysts," Science, Vol. 220, No. 4595 pp. 365–371 (Apr. 22, 1983) and in U.S. Pat. Nos. 4,176,090; 4,216,188; 4,238,364; 4,248,739; 4,271,043; 4,367,163; 4,629,712; 4,637,992; 4,761,391; 4,859,648; and 4,995,964. The disclosures of the aforementioned articles and patents are incorporated herein by reference in their entireties.

In contrast to pillared clays which have platelets that are ordered in a face-to-face arrangement, delaminated clays also contain large cations but the platelets are oriented edge-to-edge and edge-to-face in what can be described as a "house-of-cards" structure containing macropores of a size typically found in amorphous aluminosilicates in addition to the micropores found in pillared clays. (See U.S. Pat. No. 4,761,391 for a further discussion.) Such clays are distinct from those that have been subjected to exfoliation (high shear forces) which substantially destroys the house of cards structure. Thus, non-exfoliated clays should be used. It is preferred that the clay component of the support-agglomerate portion of the present catalyst be selected from non-delaminated and non-exfoliated clays.

While it is possible and permissible to modify Component (B) with guest cations as described above, such procedures add process steps to the overall preparation, and from a process point of view, are preferably not employed.

However, when Component (B) is modified by exchanging originally present cations for guest cations, the goal sought to be achieved by such exchange is to render the support-agglomerate capable of activating either the pre-catalyst or the pre-activated catalyst as described above. It is believed that the indigenous cations typically present in the aforementioned clays are already capable of accomplishing this goal.

The support-agglomerate is made from an intimate admixture of Components (A) and (B), to provide an agglomerate form of the components. The weight ratio of Component (A) to Component (B) in the agglomerate can vary typically from about 0.25:1 to about 99:1, preferably from about 0.5:1 to about 20:1, most preferably from about 1:1 to about 10:1 (e.g., 4:1).

The term "agglomerate" refers to a product that combines particles of Component (A) and Component (B) together. These components are held together by a variety of physical and/or chemical forces. More specifically, each agglomerate is preferably composed of a plurality of contiguous, constituent primary particles derived primarily from Component (A) and much smaller secondary constituent particles derived from both Component (A) and Component (B) preferably joined and/or connected at their points of contact.

The agglomerates of the present invention preferably will exhibit a higher macropore content than the constituent primary or secondary particles as a result of the interparticle voids between the constituent particles. However, such interparticle voids may be almost completely filled with the smaller secondary particles in other embodiments of the spray-dried agglomerates.

The agglomeration of Components (A) and (B) may be carried out in accordance with methods well known to the art such as by pelletizing, extrusion, shaping into beads in a rotating coating drum, and the like. A nodulizing technique whereby composite particles having a diameter of not greater than about 0.1 mm are agglomerated to particles with a diameter of at least about 1 mm by means of a granulation liquid may also be employed.

The preferred agglomerates are made by drying, preferably spray drying a slurry of Components (A) and (B). More specifically, in this embodiment, the support is made by admixing Components (A) and (B) to form a slurry, preferably an aqueous slurry, comprising typically at least 50, preferably at least 75 (e.g., at least 80), and most preferably at least 85 (e.g., at least 90), wt. % water based on the slurry weight. However, organic solvents, such as $C_5$ to $C_{12}$ alkanes, alcohols (e.g. isopropyl alcohol), may also be employed although they represent a fire hazard relative to water and often make agglomerates too fragile for use as polymerization catalysts.

To render Component (A) suitable for agglomerate formation, e.g. drying or spray drying, various milling procedures are typically employed (although not required). The goal of the milling procedure is to ultimately provide Component (A), when intended to be spray dried, with an average particle size of typically from about 0.2 to about 10 (e.g. 2 to about 10) preferably from about 4 to about 9, and most preferably from 4 to 7 microns. Desirably the milling procedures will also impart a particle size Distribution Span to the particles in the slurry of typically from 0.5 to about 3.0, and preferably from about 0.5 to about 2.0. The particle size Distribution Span is determined in accordance with the following equation.

$$\text{Distribution Span} = \frac{D_{90} - D_{10}}{D_{50}} \quad \text{Equation 1a}$$

wherein $D_{10}$ $D_{50}$ and $D_{90}$ represent the $10^{th}$, $50^{th}$, and $90^{th}$ percentile, respectively, of the particle size (diameter) distribution, i.e. a $D_{90}$ of 100 microns means that 90 volume % of the particles have diameters less than or equal to 100 microns. Still more preferably, the milling is conducted to impart a particle size distribution to the Component (A) inorganic oxides in the slurry to be spray dried such that the Component (A) colloidal content is typically from about 2 to about 60 (e.g. 2 to about 40), preferably from about 3 to about 25, and most preferably from about 4 to about 20 wt.

The colloidal content of Component (A) to be spray dried is determined by centrifuging a sample for 30 minutes at 3600 RPM. The liquid (supernatant) which remains on top of the test tube is decanted, and analyzed for % solids. The % of colloidal material is then determined by the following equation:

$$\% \text{ colloid} = \left[ \frac{\left(\frac{1-B}{B}\right) - 2.2}{\left(\frac{1-A}{A}\right) - 2.2} \right] \times 100 \quad \text{Equation 1b}$$

wherein

A=wt. solids in supernatant/100, and

B=wt. solids of original slurry/100

The colloidal content will possess a particle diameter in the colloidal range of typically less than about 1, preferably less than about 0.5, and typically from about 0.4 to about 1 micron. All particle size and particle size distribution measurements described herein are determined by a Mastersizer unit from Malvern Instruments, which operates on the principle of laser light diffraction and is known to those skilled in the art of small particle analysis.

As the colloidal content of the dry solids content of the Component (A) slurry exceeds about 60 wt. %, the constituent particles of the agglomerate can become bound too tightly together. Conversely, while the presence of at least some colloidal content of the slurry is desired, a slurry containing no colloidal content (e.g. dry milled powder alone) can produce agglomerates of the support which have extremely low physical integrity to an undesirable degree. In such instances, it may be desirable to include some alternative source of binder. Thus, it is preferred that the colloidal content of the Component (A) (as dry solids) be within the range of from about 5 to 50, more preferably from 5–40 wt. %.

One milling procedure, which has been found to impart the above-described properties, as well as the desired morphology, involves a wet milling procedure. A wet milling procedure is characterized by the presence of liquid, e.g. water, during the milling procedure. Thus, wet milling is typically performed on a slurry of the inorganic oxide particles having a solids content of typically from about 15 to about 25 weight % based on the slurry weight.

In the wet milling procedure, the washed inorganic oxide is typically subjected to a milling procedure well known in the art that is necessary to produce slurries with the particle sizes specified above. Suitable mills include hammer mills, impact mills (where particle size reduction/control is achieved by impact of the oxide with metal blades and retained by an appropriately sized screen), and sand mills (where particle size control/reduction is achieved by contact of the oxide with hard media such as sand or zirconia beads).

The colloidal particles within the wet milled material are the primary source of the colloid content in the slurry to be spray dried as described above, and are believed to act as a binder upon spray drying.

More specifically, with wet milling, Component (A) can be slurried in a media (usually water) and the mixture then subjected to intense mechanical action, such as the high speed blades of a hammer mill or rapidly churning media of a sand mill. Wet milling reduces particle size and produces colloidal silica as well.

Accordingly, the inorganic oxide (typically while still wet) is then subjected to a milling operation as described below to prepare it for spray drying. Once the target average particle size and preferably the particle size Distribution Span is imparted to Component (A), a slurry, preferably aqueous slurry, is prepared for agglomeration, preferably by spray drying.

A dry milling procedure is characterized by the substantial absence of the presence of free flowing liquid, e.g. water or solvent. Thus, while the final dry milled material may contain some absorbed moisture, it is essentially in powder form, not a suspension or solution of particles in liquid.

The dry milling referred to typically takes particulate inorganic oxide and reduces it in size either by mechanical action, impingement onto a metal surface, or collision with other particles after entrainment into a high-velocity air stream.

In the dry milling procedure, Component (A) is typically milled in a manner sufficient to reduce its average particle size to typically from about 2 to about 10, preferably from about 3 to about 7, and most preferably from about 3 to 6 microns, and its moisture content to typically less that about 50, preferably less than about 25, and most preferably less that about 15 weight %. In order to attain the dry milling particle size targets at the higher moisture contents, it may be necessary to conduct dry milling while the particles are frozen.

The dry milling is also conducted to preferably impart a particle size distribution such that the Distribution Span is typically from about 0.5 to about 3.0, preferably from about 0.5 to about 2.0, and most preferably from about 0.7 to about 1.3. Thus, the resulting dry milled material exists in the form of a powder prior to being slurried for spray drying.

The dry milling is preferably conducted in a mill capable of flash drying the inorganic oxide while milling. Flash drying is a standard industrial process where the material to be dried is quickly dispersed into a hot air chamber and exposed to an air stream of 370–537° C. The rate of air and material input is balanced such that the temperature of the outgoing air and the material entrained in it is generally 121–176° C. The whole process of drying usually takes place in less than 10 seconds, reducing the moisture content to less than about 10%. Alternatively, the inorganic oxide can be separately flash dried to the aforedescribed moisture content in a flash dryer and then placed in a dry mill and milled. Suitable dry mills include an ABB Raymond™ impact mill or an ALJET™ FLUID ENERGY MILL. Ball mills can also be used. Suitable flash drying equipment includes Bowen™ flash dryer. Other similar equipment is well known in the chemical processing industry.

Flash drying is typically accomplished by exposing the inorganic oxide to conditions of temperature and pressure sufficient to reduce the moisture content thereof to levels as described above over a period of time of typically less than about 60, preferably less than about 30, and most preferably less than about 5 seconds. Dry milling typically does not produce colloidal silica.

In accordance with one embodiment of the agglomerate formation by spray drying, at least a portion of the material constituting Component (A) is derived from wet milling, and optionally but preferably at least a portion is derived from dry milling. Thus, prior to agglomeration, Component (A) will typically comprise a mixture of previously wet milled inorganic oxide, e.g. silica gel, and dry milled inorganic oxide, e.g. silica gel powder. More specifically, the weight ratio (on a dry solids content basis as defined hereinafter) of the wet milled/dry milled inorganic oxide solids in the slurry can vary typically from about 9:0 to about 0.1:1 (e.g., 9:1), preferably from about 1.5:1 to about 0.1:1, and most preferably from about 0.6:1 to about 0.25:1. The particular wet milled/dry milled solids ratio of Component (A) employed will be selected to achieve the target properties in the final slurry to be used in agglomerate formation.

In an alternative embodiment, a sequential milling procedure can be employed to impart the target properties of average particle size and particle size distribution. The sequential milling procedure involves dry milling a sample of the Component (A) inorganic oxide and then wet milling the previously dry milled sample.

It has been observed that drying of inorganic oxide starting material during dry milling and then using the dry milled product for wet milling tends to produce a lower colloidal content relative to mixing a separately prepared dry milled product with a separately prepared wet milled product. The reason for this phenomenon is not entirely understood. However, sufficient colloidal content is produced to bind the agglomerate together in a desirable manner.

Once the target average particle size and preferably the particle size Distribution Span is imparted to Component (A), a slurry, preferably aqueous slurry, is prepared for agglomeration, preferably by spray drying.

The Component (B) layered material, e.g. clay, is typically comprised of fine particles having an average particle size of typically less than 10, preferably less than 5, and most preferably less than 1 micron, such particle sizes ranging typically from about 0.1 to about 10, preferably from about 0.1 to about 5, and most preferably from about 0.1 to about 1 microns. Other preferable physical properties of the clay include a total nitrogen pore volume of typically greater than 0.005 (e.g., 0.005 to 1.50), preferably greater than about 0.1 (e.g., 0.1 to 2) cc/g; a nitrogen surface area of typically greater than 10, preferably greater than 30 (e.g., 10 to 100) $m^2/g$; and an Apparent Bulk Density (ABD) of typically greater than 0.10, preferably greater than 0.25 (e.g., 0.10 to 0.75) g/cc. Milling procedures can be employed to achieve these target properties, if necessary.

To agglomerate by spray drying, Components (A) and (B) are admixed, typically in a suitable diluent, to form a slurry of the same. The diluent can be aqueous or organic. The preferred liquid slurry medium for spray drying is aqueous, typically greater than 75, preferably greater than 80, and most preferably greater than 95 wt. % water (e.g. entirely water).

The weight ratio of Component (A) to Component (B) in the slurry, can vary typically from about 0.25:1 to about 99:1, preferably from about 0.5:1 to about 20:1, and most preferably from about 1:1 to about 10:1 (e.g., 4:1). The solids content of the slurry containing the mixture of Components (A) and (B) can vary typically from about 5 to about 25, preferably from about 10 to about 20, and most preferably from about 15 to about 20 wt. % based on the slurry weight.

Accordingly, agglomerate formation is controlled to impart preferably the following properties to the support-agglomerate:

(1) A surface area of typically at least about 20, preferably at least about 30, and most preferably from at least about 50 m²/g, which surface area can range typically from about 20 to about 800, preferably from about 30 to about 700, and most preferably from about 50 to about 600 m²/g;

(2) A bulk density of the support-agglomerate particles of typically at least about 0.15, preferably at least about 0.20, and most preferably at least about 0.25 g/ml, which bulk density can range typically from about 0.15 to about 1, preferably from about 0.20 to about 0.75, and most preferably from about 0.25 to about 0.45 g/ml;

(3) An average pore diameter of typically from about 30 to about 300, and most preferably from about 60 to about 150 Angstroms;

(4) A total pore volume of typically from about 0.10 to about 2.0, preferably from about 0.5 to about 1.8, and most preferably from about 0.8 to about 1.6 cc/g; and (5) An attrition resistance which provides friability for suitable catalyst fragmentation for the particular polymerization process contemplated.

The particle size and particle size distribution sought to be imparted to the support-agglomerate particles is dictated and controlled by the type of polymerization reaction in which the ultimate supported catalyst will be employed. For example, a solution polymerization process typically may employ an average particle size of from about 1 to about 10 microns; a continuous stirred tank reactor (CSTR) slurry polymerization process of from about 8 to 50 microns; a loop slurry polymerization process of from about 10 to about 150 microns; and a gas phase polymerization process of from about 20 to about 120 microns. Moreover, each polymer manufacturer has its own preferences based on the particular reactor configuration.

Once the desired average particle size is determined for the support-agglomerate based on the targeted polymerization process, the particle size distribution will desirably be such that the Distribution Span is typically from about 0.5 to about 4, preferably from about 0.5 to about 3, and most preferably from about 0.5 to 2.

Accordingly, as a generalization, the average particle size of the support-agglomerate will range typically from about 4 to about 250 (e.g. about 8 to about 200), and preferably from about 8 to about 100 (e.g. about 30 to about 60) microns.

When the support-agglomerates are formed by spray drying, they can be further characterized in that typically at least 80, preferably at least 90, and most preferably at least 95 volume % of that fraction of the support-agglomerate particles smaller that the $D_{90}$ of the entire agglomerate particle size distribution possesses microspheroidal shape (i.e., morphology). Evaluation of the microspheroidal morphology is performed on that fraction of the particle size distribution of the support-agglomerates which are smaller than the $D_{90}$ to avoid distortion of the results by a few large particles which, because of their large volume, would constitute a non-representative sample of the agglomerate volume. The term "spheroidal" as used herein means small particles of a generally rounded, but not necessarily spherical shape. This term is intended to distinguish from irregular jagged chunks and leaf or rod like configurations. "Spheroidal" is also intended to include polylobed configurations wherein the lobes are also generally rounded, although polylobed structures are uncommon when the agglomerate is made as described herein.

Each microspheroid is preferably composed of a loosely to densely packed composite of Components (A) and (B) typically with some, to substantially no, interstitial void spaces, and typically substantially no visible boundaries, in an electron micrograph, between particles originally derived from Components (A) and (B).

However, microprobe image and elemental analysis of a cross-sectioned view of preferred agglomerate particles reveals that the Fe and Al ions associated with Component (B) are distributed in clusters of varying density around discrete sub-particles of material-bearing no iron or aluminum. This leads to the conclusion that, in the most preferred support-agglomerate particles, Component (B) is intimately admixed with Component (A) such that islands of inorganic oxide (e.g., silica) are surrounded by a matrix of inorganic oxide (most likely derived from the colloidal constituents of the inorganic oxide) and layered material (e.g., clay). It is believed that the varying intensity (concentration) of Al and Fe, in the matrix is indicative of varying ratios of Component (A) to Component (B) in the matrix.

The microspheroidal shape of the support significantly enhances the desired morphology of the polymers derived therefrom. Thus, one is able to simultaneously significantly enhance catalyst activity and desired polymer morphology by utilizing the 2 components of support.

The terms "surface area" and "pore volume" refer herein to the specific surface area and pore volume determined by nitrogen adsorption using the B.E.T. technique as described by S. Brunauer, P. Emmett, and E. Teller in Journal of American Chemical Society, 60, pp. 209–319 (1939).

Bulk density is measured by quickly transferring (in 10 seconds or less) the sample powder into a graduated cylinder which overflows when exactly 100 cc is reached. No further powder is added at this point. The rate of powder addition prevents settling within the cylinder. The weight of the powder is divided by 100 cc to give the density.

Spray drying conditions are typically controlled in order to impart the desired target properties described above to the agglomerate. The most influential spray drying conditions are the pH of the aqueous slurry to be spray dried, as well as its dry solids content. By "dry solids content" as used herein is meant the weight of solids in the slurry after such solids have been dried at 175° C. for 3 hours, and then at 955° C. for 1 hour. Thus, dry solids content is used to quantify the weight of solid ingredients which exist in the slurry and to avoid inclusion of adsorbed water in such weight.

Typically, the pH of the slurry used for spray drying will be controlled or adjusted to be from about 5 to about 10 (e.g., 8 to 9), preferably from about 7 to about 9, and the dry solids content will be controlled or adjusted to be typically from about 12 to 30, preferably from about 15 to about 25, and most preferably from about 18 to about 22 (e.g. 20) weight % based on the weight of the slurry and the dry weight of the gel.

Control of the remaining variables in the spray drying process, such as the viscosity and temperature of the feed, surface tension of the feed, feed rate, the selection and operation of the atomizer (preferably an air atomizer is employed and preferably without the use of a pressure nozzle), the atomization energy applied, the manner in which air and spray are contacted, and the rate of drying, are well within the skill of the spray dry artisan once directed by the target properties sought to be imparted to the product produced by the spray drying. (See for example U.S. Pat. No. 4,131,452.) Product separation from the drying air follows completion of the spray drying stage when the dried product remains suspended in the air. Any convenient collection method can be employed, such as removal from the base of the spray dryer by the use of separation equipment.

The support-agglomerate described above is contacted with a chromium compound, such as a salt, that is at least partially soluble in water or an organic liquid media. The chromium salt may be contacted with the support-agglomerate either during formation of Component (A) or Component (B) or upon mixing of Components (A) and (B) prior to milling of the combined components and/or prior to agglomeration, such as by spray drying of the components or after agglomeration has been completed. It is preferred that an aqueous solution or suspension of the chromium salt be contacted with an aqueous slurry of Components (A) and (B) prior to the agglomeration of the components forming the support-agglomerate, as described herein above.

The chromium compound suitable for use in forming the subject catalyst composition can be selected from any chromium salt of an inorganic or organic acid that has some degree of solubility with respect to the media used to mix the salt with either one of the Components (A) or (B) or the resultant support-agglomerate, as applicable. The preferred media is water. This is generally referred to as post-impregnation. For example, suitable inorganic salts are chromium halides, such as chromium dichloride, chromium chloride hexahydrate, chromium dibromide, chromium bromide hexahydrate, chromium tribromide chromium difluoride; as well as chromium nitrate; chromic anhydride, chromium phosphate; chromium$^{(II)}$ sulfate; chromium sulfate pentadecahydrate and octadecahydrate; chromium orthophosphate; and the like and mixtures thereof.

Organic chromium compounds suitable as a chromium atom source for forming the present catalyst are salts of organic acids, such as chromium acetate, chromium acetate hydrate, chromium acetylacetonate, chromium proprionate, chromium oxalate hydrate, chromium oxalate hexahydrate; amine complexes such as hexamine chromium III chloride; chloropentamine chromium chloride; hexaurea chromium III fluorosilicate; chromocene and the like and mixtures thereof.

Certain chromium compounds found useful herein have greater solubility in organic solvents. These compounds include, for example, chromocene, bis-(triphenylsilyl) chromate and the like. In such instances, the salt may be contacted with Component (A) or Component (B) or its mixtures using an organic liquid solution followed by vacuum evaporation of the organic solvent at temperatures of from ambient to about 40° C. followed by spray drying or by impregnating the chromium into a previously formed support-agglomerate.

The preferred chromium precursors are chromium sulfate, chromium nitrate, chromium acetate and chromium acetylacetonate. The most preferred precursor chromium salts are the acetate and nitrate salts of chromium.

The chromium precursor may be complexed with the Lewis acid support-agglomerate described above by:
1) contacting an aqueous solution or suspension of the chromium precursor with Component (A), such as prior to milling and/or prior to spraying of Component (A);
2) contacting an aqueous solution of a mixture of Component (A) and Component (B) prior to milling of this mixture and/or prior to agglomerating the mixture, such as by spray drying; or
3) contacting previously formed support-agglomerate attained from Component (A) and Component (B), as described above, with a solution of the chromium precursor salt.

In each instance, the chromium precursor is introduced, as an aqueous or organic solution (preferred), or slurry (that is formed from a salt having partial solubility in the mixing media). The materials may be contacted for a period of time of from about 15 to about 150 minutes, with from about 15 to 100 minutes being preferred. In certain instances, the materials are mixed for between 15 and 60 minutes and then allowed to remain in the mixer without agitation for a period of up to about 180 minutes. The materials are normally mixed at a temperature of from ambient to about 40° C.

For example, during the formation of Component (A) of the support-agglomerate described above, the chromium precursor salt may be added to the silica slurry prior to its agglomeration. Alternately and preferably, the chromium precursor salt may be admixed with the silica gel particles prior to milling or after milling in slurry form just prior to its spray drying.

Alternately, the chromium precursor salt may be added as part of the salt of an inorganic or organic compound that forms part of the composite of the clay Component (B) of the present Lewis acid support-agglomerate.

Still further and preferably, the aqueous solution of the mixture of Component (A) with Component (B) may have a chromium precursor salt added to the mixture prior to milling of the mixture of the resultant aqueous slurry and/or prior to forming an agglomerated product by spray drying the slurry (most preferred).

Finally, a slurry of Lewis acid support-agglomerate product, which has been already produced in its agglomerated form, may be contacted with an aqueous solution of chromium precursor salt and subsequently dried.

Product separation from the drying air follows completion of the spray drying stage when the dried product remains suspended in the air. Any convenient collection method can be employed, such as removal from the base of the spray dryer by the use of separation equipment.

The product of the support-agglomerate that has been treated with chromium precursor is subjected to oxidation after agglomeration to oxidize the chromium atom to a higher oxidation state (e.g., +3, +4, +6; preferably +3 or +4). The oxidation will typically be conducted at sufficient temperature and time to reduce the total volatiles to between about 0.1 and 8 wt. % where the total volatiles are determined by measuring the weight loss upon destructive calcination of the sample at 1000° C. However, oxidation will typically be conducted by heating the chromium precursor treated support-agglomerate to temperatures of typically from about 600° to about 1800° F. (316 to 985° C.), preferably from about 800° to about 1500° F. (425–815° C.), and most preferably from about 800° to about 1000° F. (425–537° C.) for periods of typically from about 1 to about 600 (e.g., 50 to 600), and preferably from about 50 to about 300 minutes. The atmosphere of oxidation should be air or other oxygen-laden gas. Oxidation should be conducted in manners that will avoid sintering.

The resultant supported chromium catalyst has chromium immobilized on and in the support-agglomerate. The amount of chromium (as Cr) present as part of the resultant catalyst should be from 0.1 to 10 weight percent, preferably from 0.2 to 5 weight percent, and more preferably from 0.3 to 2 weight percent of the resultant chromium immobilized support-agglomerate described above. For example, it has been observed that catalysts of the present invention having from 0.5 to 1.5 (e.g., 1) weight percent chromium provides a polymerization catalyst having good activity and cause bimodal molecular weight distribution of the resultant polymer product. Although not limited to the following presumption, it is believed that the chromium atoms of the precursor material are bonded (such as covalently bonded) to the support-agglomerate through oxygen atoms. For example, residual hydroxyl groups of the inorganic oxide may provide sites which react with chromium precursor and result in an oxygen bridge between the chromium atom and the support-agglomerate. Another example may be the immobilization of the chromium atom to sites associated with Component (B). Thus, the chromium atom may be immobilized with sites associated with Component (A) or Component (B) or with a combination of sites associated with Component (A) and Component (B).

After formation, the supported chromium catalyst is preferably sized prior to oxidation. This can be conveniently accomplished by screening or air classifying as is well known in the art. The particle size and particle size distribution selected will depend on the catalyst type and polymerization process to be applied, as would be well known in the art.

Normally, when the catalyst composition of the present invention is contemplated for use in a slurry polymerization process, the particle size of the support-agglomerate is from 1 to 100, preferably from 10 to 60 microns.

The subject supported chromium catalyst of the present has been found useful as the sole catalyst for the polymerization of olefinic monomers. Alternately, the chromium material formed according to the present invention may be used in combination with a metallocene, constrained geometry or bi-or tridentate complex containing catalyst, such as those described in copending applications U.S. Ser. No. 9/531,771, filed Nov. 1, 1999 and U.S. Ser. No. 60/287,602, filed Apr. 30, 2001, the teachings of which are incorporated herein by reference in their entirety. The subject supported chromium catalyst, described herein above, may be further used as the support-activator for a metallocene pre-catalyst compound. When a metallocene utilizes the chromium containing support-agglomerate of the present invention as its support, it should be first formed followed by contacting this product with a metallocene compound. Alternately, the present supported chromium catalyst may be used in combination with an independently formed supported metallocene, such as those described in the above referenced applications.

Polymerization of olefin monomers can be accomplished by contacting one or more olefinic monomers in the presence of the chromium/support-agglomerate catalyst composition of the present invention. Optionally, an organometallic reagent may be present. Such reagents are well known to act as scavenging agents for catalyst poisons that may be present in the reaction zone. These scavenger reagents include those represented by the formula:

$$M^x(R)_x \qquad (I)$$

wherein M represents an element of the Group 1, 2 or 13 of the Periodic Table, a tin atom or a zinc atom; each R independently represents a hydrogen atom, a halogen atom, hydrocarbyl, typically $C_1$ to $C_{24}$ hydrocarbyl, including $C_1$ to $C_{24}$ alkyl or alkoxy and aryl, aryloxy, arylalkyl, arylalkoxy, alkylaryl or alkylaryloxy group having 6 to 24 carbon atoms, such as a hydrogen atom, halogen atom (e.g., chlorine fluorine, bromine, iodine and mixtures thereof), alkyl groups (e.g., methyl, ethyl, propyl, pentyl, hexyl, heptyl, decyl, isopropyl, butyl, isobutyl, s-butyl, t-butyl), alkoxy groups (e.g., methyoxy, ethoxy, propoxy, butoxy, isopropoxy), aryl groups (e.g., phenyl, biphenyl, naphthyl), aryloxy groups (e.g., phenoxy), arylalkyl groups (e.g., benzyl, phenylethyl), arylalkoxy groups (benzyloxy), alkylaryl groups (e.g., tolyl, xylyl, cumenyl, mesityl), and alkylaryloxy groups (e.g., methylphenoxy) provided that at least one R is a hydrogen atom, an alkyl group having 1 to 24 carbon atoms or an aryl, arylalkyl or alkylaryl group having 6 to 24 carbon atoms; and x is the oxidation number of M.

The preferred organometallic compounds are those wherein M is aluminum.

Representative examples of organometallic compounds include alkyl aluminum compounds, preferably trialkyl aluminum compounds, such as trimethyl aluminum, triethyl aluminum, triisopropyl aluminum, triisobutyl aluminum, tri-n-propylaluminum, triisobutylaluminum, tri-n-butylaluminum, triamylaluminum, and the like; alkyl aluminum alkoxides such as ethyl aluminum diethoxide, diisobutyl aluminum ethoxide, di(tert-butyl) aluminum butoxide, diisopropyl aluminum ethoxide, dimethyl aluminum ethoxide, diethyl aluminum ethoxide, di-n-propyl aluminum ethoxide, di-n-butyl aluminum ethoxide, and the like; aluminum alkoxides such as aluminum ethoxide, aluminum propoxide, aluminum butoxide and the like; alkyl or aryl aluminum halides such as diethyl aluminum chloride, ethyl aluminum dichloride, diisopropyl aluminum chloride and the like; aluminum aryloxides such as aluminum phenoxide, and the like; and mixed aryl, alkyl or aryloxy, alkyl aluminum compounds and aluminum hydrides such as dimethylaluminum hydride, diethylaluminum hydride, diisopropylaluminum hydride, di-n-propylaluminum hydride, diisobutylaluminum hydride, and di-n-butylaluminum hydride. The most preferred organometallic compounds are the trialkyl aluminum compounds.

The organometallic reagent, when present as part of the subject catalyst composition, can be present in from 50 μmole to 0.1 mole, preferably from 100 μmole to 0.05 mole per gram of the present chromium/support-agglomerate catalyst, fully described above.

When both the chromium/support-agglomerate catalyst of the present invention and the scavenger reagent are used together, they can be either introduced into the polymerization zone sequentially or simultaneously. When introduced simultaneously, they may be first formed into a common mixture with a hydrocarbon liquid that is miscible with the hydrocarbon liquid in the reaction zone.

The amount of chromium/support-agglomerate catalyst and scavenger contained in a hydrocarbon liquid of the polymerization reaction zone may vary but typically will be controlled to provide an effective amount to sustain the polymerization reaction within the reaction zone, in manners well known to those skilled in this art.

The catalyst composition of the present invention can be used for polymerization, typically addition polymerization, processes wherein one or more monomers are contacted with the catalyst composition (either in its original inert liquid or as separated solid product, as described above) by introduction into the polymerization zone under polymerization conditions.

Suitable polymerizable monomers include ethylenically unsaturated monomers, acetylenic compounds, conjugated or non-conjugated dienes, and polyenes. Preferred monomers include olefins, for example alpha-olefins having from 2 to 20,000, preferably from 2 to 20, and more preferably from 2 to 8 carbon atoms and combinations of two or more of such alpha-olefins. Particularly suitable alpha-olefins include, for example, ethylene, propylene, 1-butene, 1-pentene, 4-methylpentene-1,1-hexene, 1-heptene, 1-octene, 1-nonene, 1-decene, 1-undecene, 1-dodecene, 1-tridecene, 1-tetradecene, 1-pentadecene or combinations thereof, as well as long chain vinyl terminated oligomeric or polymeric reaction products formed during the polymerization and $C_{10-30}$ α-olefins specifically added to the reaction mixture in order to produce relatively long chain branches in the resulting polymers. Preferably, the alpha-olefins are ethylene, propene, 1-butene, 4-methyl-pentene-1, 1-hexene, 1-octene, and combinations of ethylene and/or propene with one or more of such other alpha-olefins. Other preferred monomers include styrene, halo- or alkyl substituted styrenes, tetrafluoroethylene, vinylcyclobutene, 1,4-hexadiene, dicyclopentadiene, ethylidene norbornene, and 1,7-octadiene. Mixtures of the above-mentioned monomers may also be employed. The most preferred is ethylene alone or with other alpha-olefins.

In addition, the polymerization monomers may include functionalized ethylenically unsaturated monomers wherein the functional group is selected from hydroxyl, carboxylic acid, carboxylic acid esters, acetates, ethers, amides, amines and the like.

More specifically, the chromium catalyst compositions described herein are useful to produce polymers using high pressure polymerization, solution polymerization, slurry polymerization, or gas phase polymerization techniques. As used herein, the term polymerization includes copolymerization and terpolymerization, and the terms olefins and olefinic monomers include olefins, alpha-olefins, diolefins, styrenic monomers, acetylenically unsaturated monomers, cyclic olefins, and mixtures thereof.

For example, polymerization of olefin monomers can be carried out in the gas phase by fluidizing, under polymerization conditions, a bed comprising the target polyolefin powder and particulates of the catalyst composition using a fluidizing gas stream comprising gaseous monomer. In a solution process the (co)polymerization is typically conducted by introducing the monomer into a solution or suspension of the present catalyst composition in a liquid hydrocarbon under conditions of temperature and pressure such that the produced polyolefin forms as a solution in the hydrocarbon diluent. In the slurry process, the temperature, pressure and choice of diluent are such that the produced polymer forms as a suspension in a liquid hydrocarbon diluent.

The present catalyst system (composition) can be advantageously employed in a high pressure, solution, slurry or gas phase polymerization process. Methods and apparatus for effecting such polymerization reactions are well known. The catalyst system according to the present invention can be used in similar amounts and under similar conditions generally known for olefin polymerization catalysts. Typically for the slurry process, the temperature is from approximately 0° C. to just below the temperature at which the polymer becomes soluble in the polymerization medium. For the gas phase process, the temperature is from approximately 0° C. to just below the melting point of the polymer. For the solution process, the temperature is typically the temperature from which the polymer is soluble in the reaction medium up to approximately 275° C.

The pressure used can be selected from a relatively wide range of suitable pressures, e.g., from subatmospheric to about 20,000 psi. Preferred pressures can range from atmospheric to about 1000 psi, and most preferred from 50 to 550 psi. In the slurry or particle form process, the process is suitably performed with a liquid inert diluent such as a saturated aliphatic hydrocarbon. The hydrocarbon is typically a $C_3$ to $C_{10}$ hydrocarbon, e.g., propane, isobutane or an aromatic hydrocarbon liquid such as benzene, toluene or xylene. The polymer can be recovered directly from the gas phase process, by filtration or evaporation of the slurry of the slurry process, by polymer precipitation or by evaporation of solvent in the solution process.

The chromium/support-agglomerate catalyst of the present invention can be used as the sole catalyst composition in the polymerization of olefins. Alternately, it may be used in combination with at least one supplemental active catalyst species such as metallocene, constrained geometry, bidentate or tridentate ligand containing materials.

The morphological configuration in which the supplemental catalyst species is employed will typically involve at least one supplemental catalytic species absorbed or adsorbed in and/or on (a) the same support-agglomerate particles that contain chromium, as described herein; (b) a different support-agglomerate particles which do not contain chromium; or (c) mixtures of (a) and (b). Such supplemental catalysts are disclosed in U.S. applications Serial No. 60/287,607; Serial No. 60/287,602; Serial No. 60/287,617; and Serial No. 60/287,600; and concurrently filed and copending U.S. applications having Ser. No. 10/120,291; Ser. No. 10/120,317; Ser. No. 10/120,331; Ser. No. 10/120,310; and Ser. No. 10/120,314; the teachings of which are incorporated herein in their entirety by reference.

The present catalyst may be employed with the supplemental catalyst species in any proportion. Thus, one may customize a blend to enhance one or more of the properties of the resultant catalyst composition. For example, if the particular catalyst of the present invention provides a polymer from a particular monomer which exhibits bimodal molecular weight distribution with one modality being substantially greater than the other, a second supported catalyst (supplemental catalyst) may be used to modify the bimodal nature of the resultant polymer product. The specific identity of the supplemental supported catalyst(s) and the exact ratio to be used to form the admixture will depend on the modification of the property being observed, the nature of each catalyst component and the polymerization conditions contemplated. Such conditions can be determined by simple experimentation by one skilled in this art.

For example, in an embodiment wherein the present catalyst is employed in a mixture with particles of supplemental catalyst specie(s), the present catalyst may be a component of a catalyst system that comprises from about 5 to about 98 (e.g. 10 to 90, such as 20 to 85) weight percent of particles of a first catalyst component composed of the chromium/support-agglomerate described herein and from about 95 to about 2 (e.g. 90 to 10, such as 80 to 15, respectively) weight percent of particles of a second separately supported supplemental catalyst component.

For example, the additional particulate may be formed by:
I. contacting substantially simultaneously or sequentially in a liquid media at least one ligand forming compound comprising at least one bidentate ligand forming compound or at least one tridentate ligand forming compound or mixtures thereof with a transition metal compound and with a support-agglomerate comprising (A) at least one inorganic oxide component, and (B) at least one ion-containing layered component. The agglomerate may further have chromium atoms immobilized on the agglomerate. The resultant particles have the catalyst component(s) contained on such support-agglomerate;
II. contacting substantially simultaneously or sequentially in a liquid media at least one coordination catalyst comprising at least one transition metal bidentate ligand containing compound or at least one transition metal tridentate chelate ligand containing compound or mixtures thereof alone or further with at least one constrained geometry transition metal compound (e.g. a metallocene or its precursors, such as a cyclopentadienyl compound and a metal selected from titanium, zirconium or hafnium) with a support-agglomerate comprising (A) at least one inorganic oxide component, and (B) at least one ion-containing layered component. The agglomerate may further have chromium atoms immobilized on the agglomerate. The resultant particles have the catalyst component(s) contained on such support-agglomerate;

III. contacting substantially simultaneously or sequentially in a liquid media a mixture comprising a) at least one transition metal bidentate ligand containing compound or at least one transition metal tridentate ligand containing compound or mixtures thereof with b) at least one metallocene or constrained geometry transition metal compound (e.g. a metallocene or its precursors, such as a cyclopentadiene or its derivative compounds and a metal selected from titanium, zirconium or hafnium), and with c) a support-agglomerate comprising (A) at least one inorganic oxide component, and (B) at least one ion-containing layered component. The agglomerate may further have chromium atoms immobilized on the agglomerate. The resultant particles have the catalyst component(s) contained on such support-agglomerate; or IV. contacting substantially simultaneously or sequentially in a liquid media at least one metallocene or constrained geometry transition metal compound (e.g. a metallocene or its precursors, such as a cyclopentadiene or its derivative compounds and a metal selected from titanium, zirconium or hafnium), with a support-agglomerate comprising (A) at least one inorganic oxide component, and (B) at least one ion-containing layered component. The agglomerate may further have chromium atoms immobilized on the agglomerate. The resultant particles have the catalyst component(s) contained on such support-agglomerate.

In another embodiment, the present catalyst may be a component of a catalyst composition in which each particle is a composite of the chromium catalyst species of the present invention and at least one supplemental catalyst species. The composite particle may be formed by physically mixing the chromium support-agglomerate and a prior formed supplemental catalyst species as described above and reforming the particulate material or by introducing the present catalyst during the formation of the supplemental catalyst specie(s). The ratio of present catalyst to supplemental catalyst within each particle may vary widely and will depend on the particular end result desired (catalyst activity, polymer properties, etc.). The composition of the particles may be, for example, from about 5 to about 98 (e.g. 10 to 90, such as 20 to 85) weight percent of a first catalyst component composed of the chromium support-agglomerate described herein and from about 95 to about 2 (e.g. 90 to 10, such as 80 to 15, respectively) weight percent of a second supplemental catalyst component. The compounds useful in the formation of each of the above composite particle are described in the above referenced U.S. patent applications concurrently filed with this application.

Figure 2:
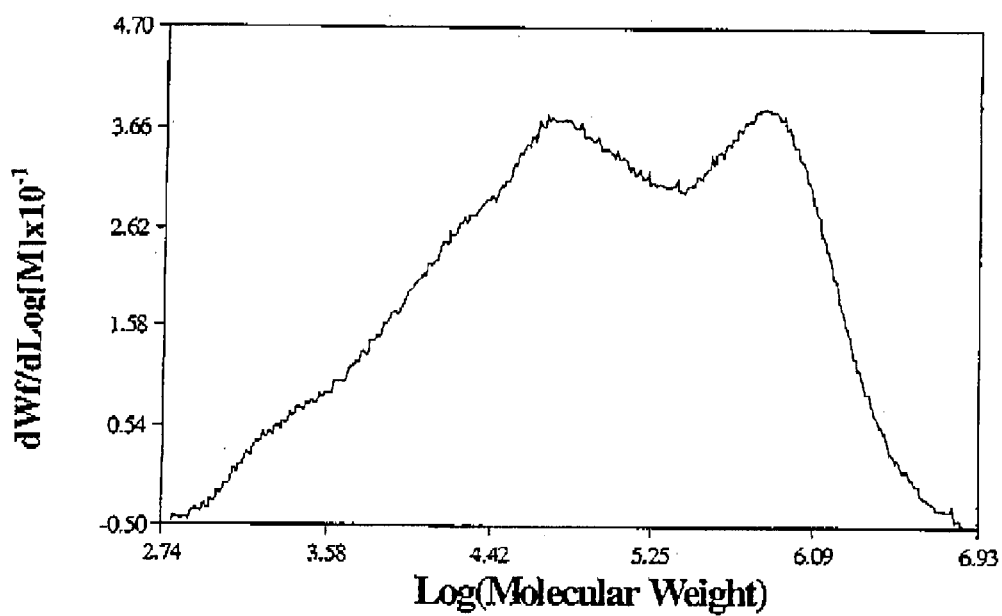
FIG. 2 is a graphic depiction of the bimodal molecular weight distribution of the polymer resulting from the polymerization of ethylene using the Chromium support-agglomerate catalyst of Sample 2. The graph represents the log of the polymer molecular weight versus dWf/dLog[M]× $10^{-1}$.

It has been unexpectedly found that the present chromium/support-agglomerate catalyst composition provides polyolefin product (e.g., polyethylene) having bimodal molecular weight distribution (Mw/Mn of greater than 16) and high molecular weight (e.g. Mw of greater than about 400,000). The bimodality of the polymer product can be observed by determining the polymer concentration with respect to molecular weight distribution. Such determination can be made using conventional gel permeation chromatography. The resultant analysis generally exhibits two concentrations at different molecular weight fractions to thus signify formation of polymer product having a high and a lower molecular weight distribution. FIGS. 1 and 2 show typical curves plotting the molecular weight distribution of polymer product obtained by using the present catalyst composition. Thus, the present catalyst composition provides an improved polymerization process wherein polymer having bimodal molecular weight distribution can be formed in a single reaction zone.

All references herein to elements or metals belonging to a certain Group refer to the Periodic Table of the Elements in Hawley's Condensed Chemical Dictionary, 12$^{th}$ Edition. Also, any references to the Group or Groups shall be to the Group or Groups as reflected in this Periodic Table of Elements using the new notation system for numbering groups.

The following examples are given as specific illustrations of the subject invention. It should be understood, however, that the invention is not limited to the specific details set forth in the examples. All parts and percentages in the examples, as well as in the remainder of the specification, are by weight unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited.

EXAMPLE 1

Preparation of Support-Agglomerate

Part A—Preparation of Base Silica Hydrogel

Silica gel was prepared by mixing an aqueous solution of sodium silicate and sulfuric acid under suitable agitation and temperature to form a silica sol that sets to a gel in about 8 minutes. The resulting gel was base washed with dilute (about 2 wt. %) ammonia ($NH_3$) solution at 65.5° C. (150° F.) for 18 to 36 hours. During this time, the silica gel was cleansed of salt by-products and the surface area was modified. The base wash was followed by a fresh water wash wherein the gel was placed in a re-circulating bath at 82° C.

The base washed gel was aged at 65–82° C. for about 36 hours and a pH of 6 to 7 for one sample designated 1A, and a pH of 7.5 to 9 for another sample designated 1B. The surface area of the gel was thereby reduced to about 600 $m^2/g$ for Sample 1A and to 300 $m^2/g$ for Sample 1B. The resulting water washed gel of Samples 1A and 1B have a $SiO_2$ content of about 35 wt. % with the balance being water, and an Average Particle Size (APS) of Samples 1A and 1B from 0.5 to 2.0 micron.

Part B(i)—Preparation of Wet Milled Hydrogel Sample 2A (SA 600 $m^2/g$)

A Sample 1A silica gel prepared in accordance with Part A was subjected to wet milling in a sand mill. Sufficient water was then added thereto to make a slurry of 20 wt. % solids. The bulk sample particle size was reduced with a blade mill and further processed through a wet sand mill to reduce the average particle size (APS) to <100 microns. The sample was then sand milled. The slurry was pumped through the sand mill at 1 liter per minute with a media load of 80% (4 liters) zirconia silicate 1.2 mm beads. The average particle size was reduced to 8 and 10 microns and the particle size distribution was 4/8/15 microns for $D_{10}$, $D_{50}$ and $D_{90}$. The surface area was 600 m²/g. The resulting wet milled sample was designated Sample 2A. Sample 2A had a colloidal content between 20 and 25 wt. % as determined by centrifugation.

Part B(ii)—Preparation of Wet Milled Hydrogel Sample 2B (SA 300 m²/g)

Example 1, Part B(i) was repeated using base silica gel Sample 1B. The resulting wet milled sample was designated Sample 2B and had a colloidal content between 15 and 30 wt. % as determined by centrifugation and a SA of 300 m²/g. The resulting material was designated Sample 2B.

Part C—Preparation of Dry Milled Sample 3B (SA 300 m²/g)

A base silica gel Sample 1B prepared in accordance with Part A was subjected to dry milling procedure as follows: The sample was flash or spray dried to a moisture content below 10 wt. %. The dried powder sample was then milled to an average particle size (APS) of about 5 microns, a surface area (SA) of still about 300 m²/g, and a N2 pore volume of 1.5 cc/g. The resulting sample was designated Sample 3B.

Part D—Preparations of Dry Milled Sample 3A (600 m2/g)

Part C was repeated except that the base silica gel was Sample 1A prepared in accordance with Example 1, Part A. The resulting dry milled sample had moisture content of less than 10 wt. %, an APS of 5 microns and a SA of 600 m²/g. The resulting sample was designated Sample 3A.

Part E—Preparation of Silica Slurry

Six different blends (designated Runs 1 to 6) of Sample 2B and Sample 3B prepared at weight ratios of Sample 3B (dry milled):Sample 2B (wet milled) as ed in Table I. Before blending, Sample 3B was slurried in water to a 20 wt. % content using a mixer. The Sample 3B slurry was then added to the 20 wt. % content aqueous slurry of Sample 2B at amounts sufficient to achieve the ratios ed in Table I.

TABLE I

Silica Support Slurries
Sample 3B (Dry Milled):Sample 2B (Wet Milled)

| Run Number | Ex No | Weight % Ratio | Weight Ratio |
|---|---|---|---|
| 1 | Ex 1 Part E | 79/21 | 3.75:1 |
| 2 | Ex 1 Part E | 78/22 | 3.50:1 |
| 3 | Ex 1 Part E | 75/25 | 3.00:1 |
| 4 | Ex 1 Part E | 70/30 | 2.25:1 |
| 5 | Ex 1 Part E | 60/40 | 1.50:1 |
| 6 | Ex 1 Part E | 0/100 | 0:1 |

Part F—Preparation of Alternate Silica Support Slurries

Part E was repeated except that Sample 3B (300 m²/g) was replaced with Sample 3A (600 m²/g) and Sample 2B (300 m²/g) was replaced with Sample 2A (600 m²/g). The dry milled/wet milled ratios employed are summarized at Table V and the slurries designated Runs 7 to 9.

TABLE II

Sample 3A (Dry Milled):Sample 2A (Wet Milled)

| Run Number | Weight % Ratio | Weight Ratio |
|---|---|---|
| 7 | 75/25 | 3.00:1 |
| 8 | 60/40 | 1.50:1 |
| 9 | 0/100 | 0:1 |

Part G—Preparation of Clay Slurry

A montmorillonite clay available from Southern Clay, under the trade names, Montmorillonite BP Colloidal Clay, was obtained. This clay has the following properties as summarized at Table III.

TABLE III

Chemical Composition of Montmorillonite BP Colloidal Clay

| Chemical Composition | | Physical Properties | |
|---|---|---|---|
| Component | Weight % | Appearance | Tan Powder |
| SiO2 | 69.5 | Apparent Bulk Density | 0.45 g/cc |
| Fe2O3 | 4.4 | Surface Area | 70 m²/g |
| Al2O3 | 19.0 | APS | 1.5 microns |
| MgO | 2.3 | Average Pore Diameter | 114 Å |
| CaO | 1.0 | Total Pore Volume | 0.20 cc/g |
| Na2O | 2.7 | | |
| SO4 | 0.6 | | |

Part H—Preparation of Silica/Clay Slurry for Spray Drying

Each of the silica slurries of Runs 1 to 9 was combined with the clay slurry of Part G in a manner sufficient to control the weight ratio of silica: clay dry solids to be as reported at Table IV. Each slurry was adjusted with acid (sulfuric acid) or base (ammonium hydroxide) to achieve a slurry pH of 7–8.5. The APS of the slurry solids was about 4 to 5 microns, the total dry solids content of the slurry was about 15 to 18 wt. %. The resulting slurries are designated Runs 10 to 18.

TABLE IV

Spray Drying or Tray Drying Slurry and Conditions

| Run No. | Ex. No. | Source of Silica (Run Nos.) | Silica:Clay Dry Solids Ratio (w/w) |
|---|---|---|---|
| 10. | Ex 1 Pt H | 1 | 95:5 |
| 11. | Ex 1 Pt H | 2 | 90:10 |
| 12. | Ex 1 Pt H | 3 | 80:20 |
| 13. | Ex 1 Pt H | 4 | 65:35 |
| 14. | Ex 1 Pt H | 5 | 50:50 |
| 15. | Ex 1 Pt H | 6 | 25:75 |
| 16. | Ex 1 Pt H | 7 | 80:20 |
| 17. | Ex 1 Pt H | 8 | 50:50 |
| 18. | Ex 1 Pt H | 9 | 25:75 |

Part I—Spray Drying of Silica/Clay Slurry

The pH value of the silica/clay slurry was adjusted and was then pumped to a spray dryer to dry the mixture and to form microspheroidal agglomerates. All spray drying is conducted by using a Bowen 3-ft. diameter spray dryer with inlet-outlet temperatures of 350/150° C. and a two-fluid spray nozzle using air at 10–30 psi to atomize the slurry. The air through-put of the Niro is dampened to keep the spray chamber under 7" water vacuum and the slurry is fed at 250–300 cc/min. The product is then collected in the chamber collection pot, located directly under the drying chamber, where the coarsest fraction drops out from air entrainment. Other, smaller fractions go to a cyclone collection pot and the smallest to a baghouse. The chamber material is then screened through 200 to 250 mesh to give the desired APS of 40–55 microns. The Total Volatiles (TV %) at 954.4° C. (1750° F.) of the spray dried product is in the range of 2–20 wt. %, so further drying in a static bed oven at 150–800° C. is then used to lower the total volatiles down to 0.5–5%.

The total yield of material from the spray dryer chamber collection pot and from screening the same is about 15–20 wt. %.

Table V below reports silica/clay morphological properties of the resulting agglomerates. The resulting Agglomerate Samples are designated Runs 19 to 27.

TABLE V

Spray Dried Silica/Clay Support-Agglomerate Product Properties

| | | Slurry | Agglomerate Properties | | | | |
|---|---|---|---|---|---|---|---|
| Run No. | Ex. No. | Source from Table VII (Run No.) | Silica/ Clay (Weight Ratio) | APS (microns) | SA (m²/g) | Pore Vol. (cc/g) | Drying Procedure |
| 19. | Ex 1 | 10. | 95:5 | 45 | 275 | 1.65 | Spray |
| 20. | Ex 1 | 11. | 90:10 | 45 | 268 | 1.61 | Spray |
| 21. | Ex 1 | 12. | 80:20 | 45 | 251 | 1.48 | Spray |
| 22. | Ex 1 | 13. | 65:35 | 45 | 213 | 1.28 | Spray |
| 23. | Ex 1 | 14. | 50:50 | 45 | 185 | 1.04 | Spray |
| 24. | Ex 1 | 15. | 25:75 | 45 | 160 | 0.64 | Spray |
| 25. | Ex 1 | 16. | 80:20 | 45 | 494 | 1.16 | Spray |
| 26. | Ex 1 | 17. | 50:50 | 45 | 322 | 0.83 | Spray |
| 27. | Ex 1 | 18. | 25:75 | 45 | 192 | 0.54 | Spray |

EXAMPLE 2

A. General Procedure for Preparation of Cr/Support-Agglomerate Material

The chromium/support-agglomerate was prepared by spray-drying an aqueous mixture (contain about 15% solids) of clay (montmorillonite, APS (average particle size) about 1.5 um), wet-milled silica powder (APS about 5 um), sand-milled silica hydrogel (contain~25% colloid; APS about 5–8 $\mu$m), and chromium acetate solution (1 wt %). The percentages of the clay, silica powder and hydrogel may be varied to meet the desired specific physical properties of the particles. The SA (surface area) is normally between 185–600 m²/g, while the PV (pore volume-$N_2$) is from 0.6–1.6 cc/g.

B. Spray-Dry Feed Cr/Support-Agglomerate (SDF) Catalyst

A solid slurry of Example I, Table 4, Run 16 was mixed with 1 wt % chromium acetate solution. This slurry was used as spray dryer feed to give spherical particles having 464 m²/g surface area and 1.24 cc/g pore volume ($N_2$). The particle size for this material was 53 micron.

C. Post Impregnation Cr/Support-Agglomerate (PI) Catalyst.

A silica-clay support-agglomerate prepared according to Part A above, except that no chromium acetate was present, was treated with an aqueous solution of chromium acetate at RT. The resulting mixture was then flash dried to obtain the PI Cr support-agglomerate product. The SA=396 m²/g, PV=1.08 cc/g, APS=58 micron.

D. Activation of Cr/Support-Agglomerate:

30 c.c. of each catalyst sample formed above in Parts B and C was fluidized in a quartz tube (4.8 cm O.D.) which had a sintered frit to support the catalyst powder. Dry air (formed by passing through beds containing activated alumina) to give a gas having less than 1 ppm $H_2O$ was used as fluidizing medium. The dry air flow rate was 40 liter per hour. The fluidized bed was heated at the rate of 400° C./hour to the pre-set temperature defined in the Table IV below and then maintained at the temperature for 5 hours. The quartz tube with the activated catalyst sample was then transferred to a glass container under dry nitrogen for storage.

EXAMPLE 3

Polymerization Using Activated Cr/Support-Agglomerate Catalyst

Each of the activated catalyst of Example 2 above was added to 350 ml heptane that contained 0.1 mmole triisobutylaluminum (1 M in toluene). The catalyst mixture was injected into a pre-heated (80° C.) and pre-vacuumed 2 liter zipperclave polymerization reactor. Ethylene gas was rapidly introduced into the reactor until a pressure of 200 psi was attained. Ethylene consumption was then monitored by a flow meter to maintain the reactor pressure of 200 psi for one hour period. The unreacted ethylene was then removed and the heptane/PE slurry was deactivated by the addition of acetone. The supernatant liquid was removed and the resultant granular polyethylene powder was washed with acetone and then dried in a vacuum oven maintained at 60° C. for 3 hours.

TABLE IV

| Sample # | Preparation Method | Activation Temp. (° C.) | Catalyst Wt (mg) | PE Yield (g) | BD (g/cc) | Mw × 10³ | Mw/Mn |
|---|---|---|---|---|---|---|---|
| 1 | SDF | 482 | 100 | 70.1 | 0.29 | 460.7 | 27 |
| 1 | SDF | 593 | 100 | 88.1 | 0.30 | 396.3 | 21.4 |
| 3 | PI | 593 | 40 | 94.4 | 0.27 | 482.9 | 25.2 |

EXAMPLE 4

Comparative Determination of Hydrogen Response Between Present Cr/Support-Agglomerate Catalyst and a Commercially Available Chromium Silica Catalyst The catalyst of Example 2, Part B above was activated under an oxygen atmosphere at 593° C. for 5 hours. In the same manner, a commercially available silica base chromium catalyst with 3% Ti and 1% Cr (Sylopol® 965 of W. R. Grace & Co; Pore volume=1.0 cc/g; SA=350 m²/g.) was activated. Both catalysts were used in polymerization procedures described in Example 3 above except that hydrogen was introduced into the reactor along with the ethylene monomer. Three different concentrations of hydrogen to ethylene were tested and the results given herein below.

TABLE VII

| H$_2$/Ethylene ratio | HLMI* Using Cr/support-agglomerate | HLMI* Using commercial Cr/silica/titania |
|---|---|---|
| 0 | <0.01 | 0.41 |
| 0.053 | 4.74 | 2.05 |
| 0.111 | 6.81 | 2.17 |

HLMI = High/Low Melt Index

The principals, preferred embodiments and modes of operation of the present invention have been described in the foregoing specification. The invention which is intended to be protected herein, however, is not to be construed as limited to be particular forms disclosed, since these are to be regarded as illustrative rather than restrictive. Variations and changes may be made by those skilled in the art, without departing from the spirit of the invention.

What is claimed is:

1. A catalyst useful in the polymerization of olefins comprising:
a support-agglomerate comprising (A) at least one inorganic oxide component; (B) at least one ion-containing layered component; and chromium atoms immobilized to at least one component of the support-agglomerate; wherein, within said support-agglomerate, said component (B) is intimately dispersed with said component (A); and the weight ratio of said component (A) to said component (B) is from 0.25:1 to 99:1.

2. The catalyst of claim 1 wherein component (A) of the support-agglomerate is derived from porous inorganic oxides selected from the group consisting essentially of $SiO_2$, $Al_2O_3$, $AlPO_4$, MgO, $TiO_2$, $ZrO_2$; $SiO_2.Al_2O_3$, $MgO.SiO_2$, $MgO.SiO_2.Al_2O_3$, $SiO_2.TiO_2$, $SiO_2.TiO_2.Al_2O_3$, $SiO_2.Cr_2O_3.Al_2O_3$ and $SiO_2.Cr_2O_3.TiO_2$ and said chromium atoms are present in from 0.1 to 10 weight percent of the chromium immobilized support-agglomerate.

3. The catalyst of claim 2 wherein Component (B) of the support-agglomerate is derived from at least one ion containing layered material having interspaces between the layers and capable of exhibiting Lewis acidity, said layered material having a cationic component and an anionic component, wherein said cationic component is present within the interspace of the layered material.

4. The catalyst of claim 2 wherein component (A) of the support-agglomerate is derived from a porous inorganic oxide composed of at least about 80 weight percent silica gel.

5. The catalyst of claim 4 wherein said silica gel has an average particle size of 0.2 to 10 microns and a particle Distribution Span of from 0.5 to 3.

6. The catalyst of claim 1 wherein the Component (B) is derived from layered clay and clay minerals having a three dimensional structure wherein stronger bonds are present in two of the three dimensions and said clay and clay minerals have a negative charge.

7. The catalyst of claim 2 wherein the Component (B) is derived from layered clay and clay minerals having a three dimensional structure wherein stronger bonds are present in two of the three dimensions and said clay and clay minerals have a negative charge.

8. The catalyst of claim 3 wherein the Component (B) is derived from layered clay and clay minerals having a three dimensional structure wherein stronger bonds are present in two of the three dimensions and said clay and clay minerals have a negative charge.

9. The catalyst of claim 4 wherein the Component (B) is derived from layered clay and clay minerals having a three dimensional structure wherein stronger bonds are present in two of the three dimensions and said clay and clay minerals have a negative charge.

10. The catalyst of claim 6 wherein the Component (B) is derived from layered clay selected from smectites, vermiculites, mica and hard micas and mixtures thereof.

11. The catalyst of claim 7 wherein the Component (B) is derived from layered clay selected from smectites, vermiculites, mica and hard micas and mixtures thereof.

12. The catalyst of claim 8 wherein the Component (B) is derived from layered clay selected from smectites, vermiculites, mica and hard micas and mixtures thereof.

13. The catalyst of claim 9 wherein the Component (B) is derived from layered clay selected from smectites, vermiculites, mica and hard micas and mixtures thereof.

14. The catalyst of claim 10 wherein the Component (B) is derived from montmorillonite.

15. The catalyst of claim 11 wherein the Component (B) is derived from montmorillonite.

16. The catalyst of claim 12 wherein the Component (B) is derived from montmorillonite.

17. The catalyst of claim 13 wherein the Component (B) is derived from montmorillonite.

18. The catalyst of claim 6 wherein the Component (B) is derived from layered clay that has been subjected to pillaring.

19. The catalyst of claim 7 wherein the Component (B) is derived from layered clay that has been subjected to pillaring.

20. The catalyst of claim 8 wherein the Component (B) is derived from layered clay that has been subjected to pillaring.

21. The catalyst of claim 9 wherein the Component (B) is derived from layered clay that has been subjected to pillaring.

22. The catalyst of claim 2 wherein the support-agglomerate comprises component (A) to (B) in a weight ratio of from 0.025:1 to 99:1 and has a surface area of from about 20 to about 800 m$^2$/g; a bulk density of at least about 0.15 g/ml; an average pore diameter of from 30 to 300 Å; a total pore volume of from about 0.1 to about 2 cc/g; and an average particle size of from about 4 to about 250 microns and the chromium immobilized support agglomerate has from 0.2 to 5 weight percent chromium.

23. The catalyst of claim 2 wherein the support-agglomerate comprises component (A) to (B) in a weight ratio of from 0.025:1 to 99:1 and has a surface area of from about 20 to about 800 m$^2$/g; a bulk density of at least about 0.15 g/ml; an average pore diameter of from 30 to 300 Å; a total pore volume of from about 0.1 to about 2 cc/g; and an average particle size of from about 4 to about 250 microns and the chromium immobilized support agglomerate has from 0.2 to 5 weight percent chromium.

24. The catalyst of claim 2 wherein the support-agglomerate comprises component (A) to (B) in a weight ratio of from 0.025:1 to 99:1 and has a surface area of from about 20 to about 800 m$^2$/g; a bulk density of at least about 0.15 g/ml; an average pore diameter of from 30 to 300 Å; a total pore volume of from about 0.1 to about 2 cc/g; and an average particle size of from about 4 to about 250 microns and the chromium immobilized support agglomerate has from 0.2 to 5 weight percent chromium.

25. The catalyst composition of claim 1, 2, 3, 4, 5, 6, 10, 18, 22 or 23 wherein the composition further comprising at least one supplemental catalyst specie selected from a supported metallocene, a supported transition metal bidentate ligand containing compound, a supported transition metal tridentate ligand containing compound, supported constrained geometry transition metal complex or precursors of said complexes and compounds, or mixtures thereof.

26. The catalyst of claim 25 wherein the support for each of the at least one supplemental catalyst specie is independently selected from the group consisting essentially of an agglomerate of (A) at least one inorganic oxide component and (B) at least one ion-containing layered component, wherein the weight ratio of said component (A) to component (B) is from 0.25:1 to 99:1; and wherein said support-agglomerate is free of chromium atoms or has chromium atoms immobilized to the support-agglomerate.

27. The catalyst composition of claim 26 wherein the composition comprises a mixture of particles of chromium/support-agglomerate catalyst and particles of at least one supplemental catalyst species.

28. The catalyst composition of claim 26 wherein the composition comprises particles composed of a mixture of chromium/support-agglomerate catalyst and of at least one supplemental catalyst species.

29. The catalyst of claim 1 wherein the chromium atoms are immobilized through oxygen atoms to at least one component of the support-agglomerate.

30. The catalyst of claim 2 wherein the chromium atoms are immobilized through oxygen atoms to at least one component of the support-agglomerate.

31. The catalyst of claim 3 wherein the chromium atoms are immobilized through oxygen atoms to at least one component of the support-agglomerate.

32. The catalyst of claim 4 wherein the chromium atoms are immobilized through oxygen atoms to at least one component of the support-agglomerate.

33. The catalyst of claim 5 wherein the chromium atoms are immobilized through oxygen atoms to at least one component of the support-agglomerate.

34. The catalyst of claim 6 wherein the chromium atoms are immobilized through oxygen atoms to at least one component of the support-agglomerate.

35. The catalyst of claim 7 wherein the chromium atoms are immobilized through oxygen atoms to at least one component of the support-agglomerate.

36. The catalyst of claim 8 wherein the chromium atoms are immobilized through oxygen atoms to at least one component of the support-agglomerate.

37. The catalyst of claim 9 wherein the chromium atoms are immobilized through oxygen atoms to at least one component of the support-agglomerate.

38. The catalyst of claim 10 wherein the chromium atoms are immobilized through oxygen atoms to at least one component of the support-agglomerate.

39. The catalyst of claim 11 wherein the chromium atoms are immobilized through oxygen atoms to at least one component of the support-agglomerate.

40. The catalyst of claim 12 wherein the chromium atoms are immobilized through oxygen atoms to at least one component of the support-agglomerate.

41. The catalyst of claim 13 wherein the chromium atoms are immobilized through oxygen atoms to at least one component of the support-agglomerate.

42. The catalyst of claim 14 wherein the chromium atoms are immobilized through oxygen atoms to at least one component of the support-agglomerate.

43. The catalyst of claim 15 wherein the chromium atoms are immobilized through oxygen atoms to at least one component of the support-agglomerate.

44. The catalyst of claim 16 wherein the chromium atoms are immobilized through oxygen atoms to at least one component of the support-agglomerate.

45. The catalyst of claim 17 wherein the chromium atoms are immobilized through oxygen atoms to at least one component of the support-agglomerate.

46. The catalyst of claim 18 wherein the chromium atoms are immobilized through oxygen atoms to at least one component of the support-agglomerate.

47. The catalyst of claim 19 wherein the chromium atoms are immobilized through oxygen atoms to at least one component of the support-agglomerate.

48. The catalyst of claim 20 wherein the chromium atoms are immobilized through oxygen atoms to at least one component of the support-agglomerate.

49. The catalyst of claim 21 wherein the chromium atoms are immobilized through oxygen atoms to at least one component of the support-agglomerate.

50. The catalyst of claim 22 wherein the chromium atoms are immobilized through oxygen atoms to at least one component of the support-agglomerate.

51. The catalyst of claim 23 wherein the chromium atoms are immobilized through oxygen atoms to at least one component of the support-agglomerate.

52. The catalyst of claim 24 wherein the chromium atoms are immobilized through oxygen atoms to at least one component of the support-agglomerate.

53. The catalyst of claim 25 wherein the chromium atoms are immobilized through oxygen atoms to at least one component of the support-agglomerate.

54. The catalyst of claim 26 wherein the chromium atoms are immobilized through oxygen atoms to at least one component of the support-agglomerate.

* * * * *